US007481109B2

(12) United States Patent
Moore et al.

(10) Patent No.: US 7,481,109 B2
(45) Date of Patent: Jan. 27, 2009

(54) INERTIAL MEASUREMENT SYSTEM AND METHOD WITH BIAS CANCELLATION

(75) Inventors: Robert H. Moore, Antioch, CA (US); Ichiro Shirasaka, Danville, CA (US); Randall Jaffe, Clayton, CA (US)

(73) Assignee: Custom Sensors & Technologies, Inc., Moorpark, CA (US)

(*) Notice: Subject to any disclaimer, the term of this patent is extended or adjusted under 35 U.S.C. 154(b) by 1 day.

(21) Appl. No.: 11/726,404

(22) Filed: Mar. 20, 2007

(65) Prior Publication Data
US 2007/0240486 A1 Oct. 18, 2007

Related U.S. Application Data

(63) Continuation-in-part of application No. 11/072,064, filed on Mar. 4, 2005, now Pat. No. 7,191,636.

(60) Provisional application No. 60/785,911, filed on Mar. 24, 2006.

(51) Int. Cl.
*G01C 19/00* (2006.01)
*G01C 25/00* (2006.01)

(52) U.S. Cl. .................................. 73/504.02; 73/1.77

(58) Field of Classification Search .............. 73/504.02, 73/504.04, 504.12, 504.13, 510, 511, 1.37, 73/1.38, 1.77
See application file for complete search history.

(56) References Cited

U.S. PATENT DOCUMENTS

| 2,995,934 | A | | 8/1961 | Harvey |
| 3,619,906 | A | | 11/1971 | Yates |
| 3,736,791 | A | | 6/1973 | Cantwell |
| 3,757,093 | A | | 9/1973 | Licata |
| 4,399,694 | A | | 8/1983 | Mayer |
| 4,590,801 | A | * | 5/1986 | Merhav ..................... 73/510 |
| 4,686,771 | A | * | 8/1987 | Beveventano et al. ......... 33/324 |
| 5,194,872 | A | | 3/1993 | Musoff |
| 5,438,410 | A | | 8/1995 | Killpatrick |
| 6,285,111 | B1 | * | 9/2001 | Hulsing, II .................. 310/306 |
| 6,467,345 | B1 | * | 10/2002 | Neukermans et al. ..... 73/504.02 |
| 6,701,786 | B2 | * | 3/2004 | Hulsing, II ............... 73/514.02 |
| 2002/0174720 | A1 | | 11/2002 | Cardarelli |

OTHER PUBLICATIONS

Neal, S.R., et al., "Self-Alignment of a Gimballess Inertial Navigation System", NWC Technical Publication 4463, Mar. 1968, Naval Weapons Center, China Lake, California.

* cited by examiner

*Primary Examiner*—Helen C. Kwok
(74) *Attorney, Agent, or Firm*—Edward S. Wright

(57) ABSTRACT

System having one or more inertial sensors in which one or more of the sensor input axes are modulated in orientation about an axis substantially perpendicular to the input, or sensitive, axis of the sensor and, in some embodiments, by also enhancing the accuracy of such a system to provide improved signal to noise ratio and reduced sensitivity to errors in alignment of the sensor axes to the dither axes.

29 Claims, 20 Drawing Sheets

Sinusoidal Dither Waveform
(Frequency f1)

Square Wave Dither Waveform
(Frequency f2)

Combined Dither Waveform
(Frequencies f1 and f2)

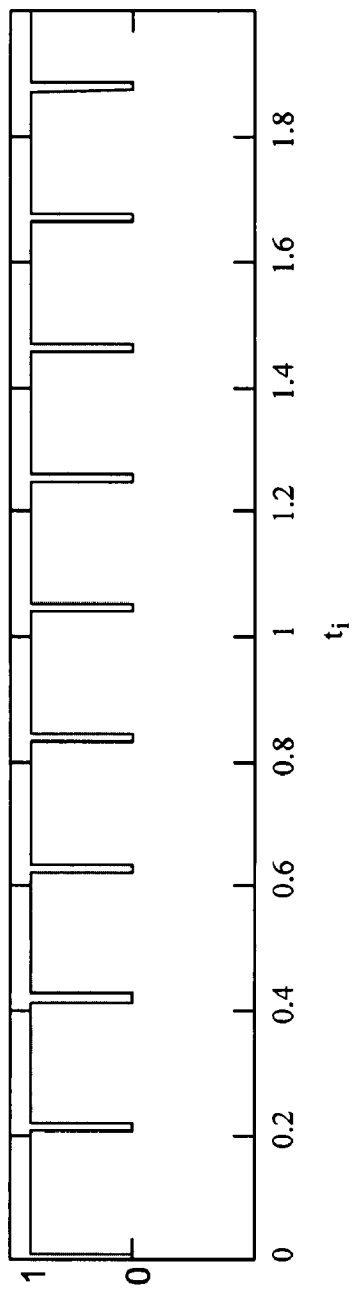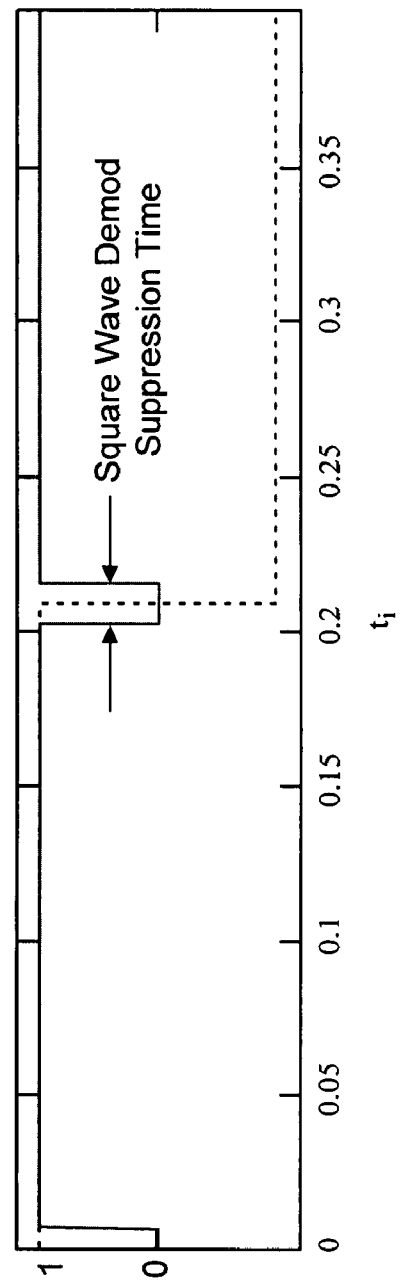
Fig. 14A
Fig. 14B

INERTIAL MEASUREMENT SYSTEM AND METHOD WITH BIAS CANCELLATION

CROSS-REFERENCE TO RELATED APPLICATIONS

Continuation-in-Part of Ser. No. 11/072,064, now U.S. Pat. No. 7,191,636. Also based on Provisional Application No. 60/785,911, filed Mar. 24, 2006, the priority of which is also claimed.

BACKGROUND OF THE INVENTION

1. Field of Invention

This invention pertains generally to inertial measurement, and, more particularly, to an inertial measurement system and method in which the fixed bias offset of rate sensors or gyroscopes is cancelled.

2. Related Art

Angular rate sensors or gyroscopes (gyros) exhibit a non-zero output in the absence of rotation about the input axis. This non-zero output is called bias, and it can cause significant errors in inertial measurements. The magnitude of the error depends upon the type of sensor or gyroscope used. In applications with stringent limits on offset errors, more expensive sensors with very low residual offset errors must generally be used, and those sensors are often relatively large and heavy.

Heretofore, there have been some attempts to eliminate offset errors by rotating a gyro about the input axis of the sensor, which is bad because it produces a rotation rate signal that must be dealt with. In other systems, horizontal inertial instruments such as gyroscopes and accelerometers have been rotated continuously in carousel fashion about a vertical axis. However, it is not always feasible or even desirable to apply a constant rotation to such instruments.

With ring laser gyros, certain errors have been eliminated by dithering the sensors about the input axis. However, as noted above, rotating a sensor about its input axis is undesirable because it provides an angular rate input other than the one to be detected.

In inertial systems of the prior art it is also necessary to rely on complex models to predict variation in offsets over time and due to factors such as temperature. These models can be quite useful in some applications, but it is often necessary to cancel offsets to a higher level of precision than the models can provide.

OBJECTS AND SUMMARY OF THE INVENTION

It is in general an object of the invention to provide a new and improved system and method for inertial measurement in which bias offset is cancelled.

Another object of the invention is to provide a system and method of the above character which overcome the limitations and disadvantages of the prior art.

These and other objects are achieved in accordance with the invention by providing a system having one or more inertial sensors in which one or more of the sensor input axes are modulated in orientation about an axis substantially perpendicular to the input, or sensitive, axis of the sensor and, in some embodiments, by also enhancing the accuracy of such a system to provide improved signal to noise ratio and reduced sensitivity to errors in alignment of the sensor axes to the dither axes.

BRIEF DESCRIPTION OF THE DRAWINGS

FIGS. 13A-13C and 14A-14B are graphical representations of waveforms in an inertial rate system with gyro bias washout modulation incorporating the invention.

DETAILED DESCRIPTION

Figure 1:
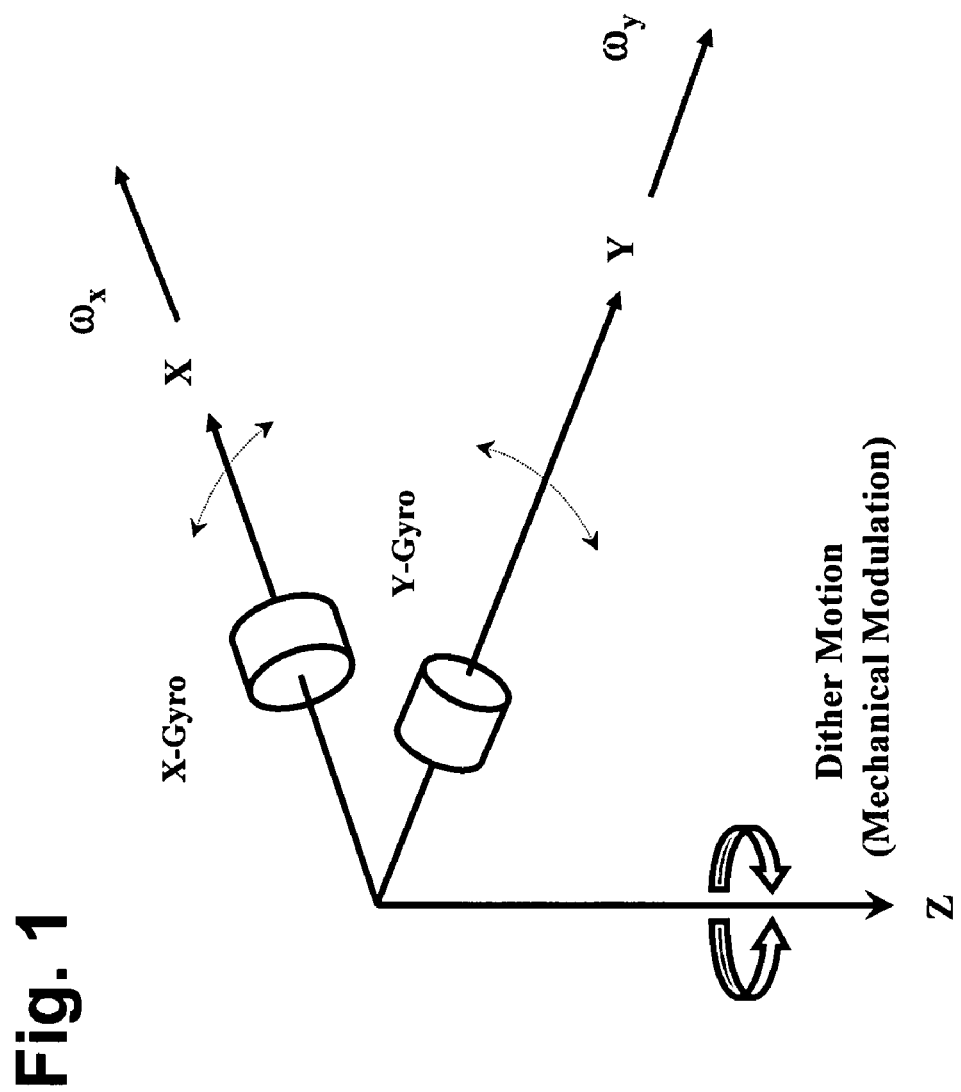
FIG. 1 is a schematic illustration of one embodiment of an inertial rate system with gyro bias washout modulation.

As illustrated in FIG. 1, two angular rate sensors or gyroscopes X-Gyro and Y-Gyro have their input axes aligned with the x- and y-axes, respectively. Input axis modulation or dither introduces an oscillatory rotation about the z-axis which is perpendicular to the input axes. The dither oscillation can range in frequency from a few milliHertz to 100 Hertz, or more, depending upon the type of dithering motion employed, with lower frequencies being used for square wave modulation or two-point indexing dither and higher frequencies being used with sinusoidal and other periodic waveforms. The magnitude of the dither is typically on the order of a few milliradians to 20 degrees, but it can potentially be as high as ±90 degrees if input axis reversal is desired.

The dithering motion causes the input axes of the two rate sensors or gyros to rotate with respect to fixed inertial reference axes, with the change in angular alignment of the sensor axes being equal to the instantaneous angular position of the dither modulation. An angular pickoff device (not shown) detects the angular displacement and provides a signal which is used in processing the signals from the rate sensors to remove the effect of the modulation.

Figure 2:
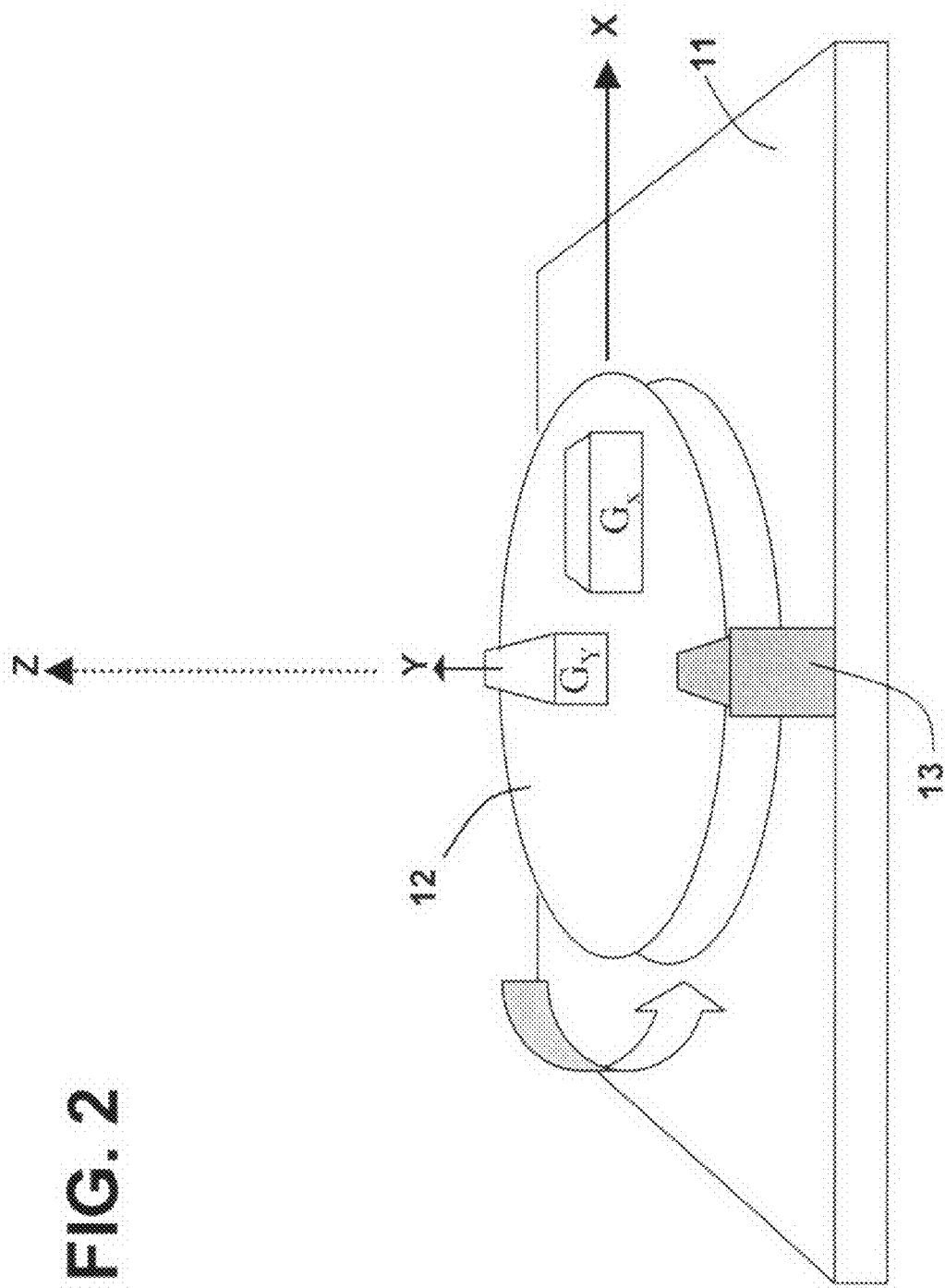
FIG. 2 is a schematic perspective view of one embodiment of a rate sensor system according to the invention.

In the embodiment of FIG. 2, the system includes a mounting base 11 and two angular rate sensors or gyroscopes $G_x$ and $G_y$ which are mounted on a modulator 12 on the base, with the input axes of the sensors nominally aligned with the x- and y-axes of the base. The modulator rotates the sensors about the z-axis which is perpendicular to input axes of the sensors and to the base. The rotation is oscillatory or dithering in nature, with a frequency on the order of a few milliHertz to several hundred Hertz and an amplitude on the order of several milliradians to tens of degrees. A sensor 13 monitors the position of the modulator and provides a signal corresponding to the instantaneous angular displacement of the modulator and the rate sensors. As discussed more fully hereinafter, that signal allows the system to demodulate or remove the effect of the modulation in connection with the processing of the gyro output signals.

The modulator can be of suitable known design, including oscillating mechanical flexures or springs, voice-coil actuators, galvanometers, piezoelectric actuators, motors, or MEMS-base structures. The amplitude of the modulation should be large enough to provide adequate resolution of the gyro output signals, and the frequency should be higher than the rotation to be measured. For dynamic navigation applications, the frequency of modulation should be high enough so that it is outside the frequency band of the rotation to be measured. For gyrocompassing, where it is assumed that the system is stationary with respect to the earth, the frequency can be much lower. In addition, the modulator must provide stable motion in the plane of the sensor axes. The motion can be of any suitable type, including a simple periodic waveform such as a sine wave or a square wave, or a more complex motion.

While the modulator has been described as a planar structure rotated about an axis perpendicular to its plane, it could be realized in other ways so long as the basic requirement for modulation is met, namely, that of producing a rotation of one or more gyro input axes that results in an oscillation of the orientation of these input axes.

Modulation sensor 13 can also be of conventional design such as a capacitive sensor, an inductive sensor with a coil and magnet, an optical sensor, or an encoder. The rotation of the modulator causes the input axes of the rate sensors or gyros to rotate with respect to the fixed axes of the base, and the difference in alignment between sensor axes and the axes of the base at any given time is equal to the instantaneous angular position of the modulator. Unlike prior art devices which rotate the sensor about the input axis and thereby apply an angular rate input to the sensor, the modulator rotates the input axes themselves, and there is no spurious rate input. The orientation of the input axes is varied in a dithering manner with a relatively rapid, oscillatory motion, and in the absence of other externally applied angular inputs, the rotation of the sensor axes does not produce a rotation rate signal.

The demodulator output signals can be fed into analog signal processing circuitry for producing an analog output of the applied external rotation $\Omega_N$, or they can be converted to a digital signal and processed using digital signal processing (DSP) for filtering, compensation of errors, and output. Alternatively, the outputs of the gyros and the signal conditioning circuit can be in digital form, and the demodulators can be implemented in digital form as well.

Figure 3:
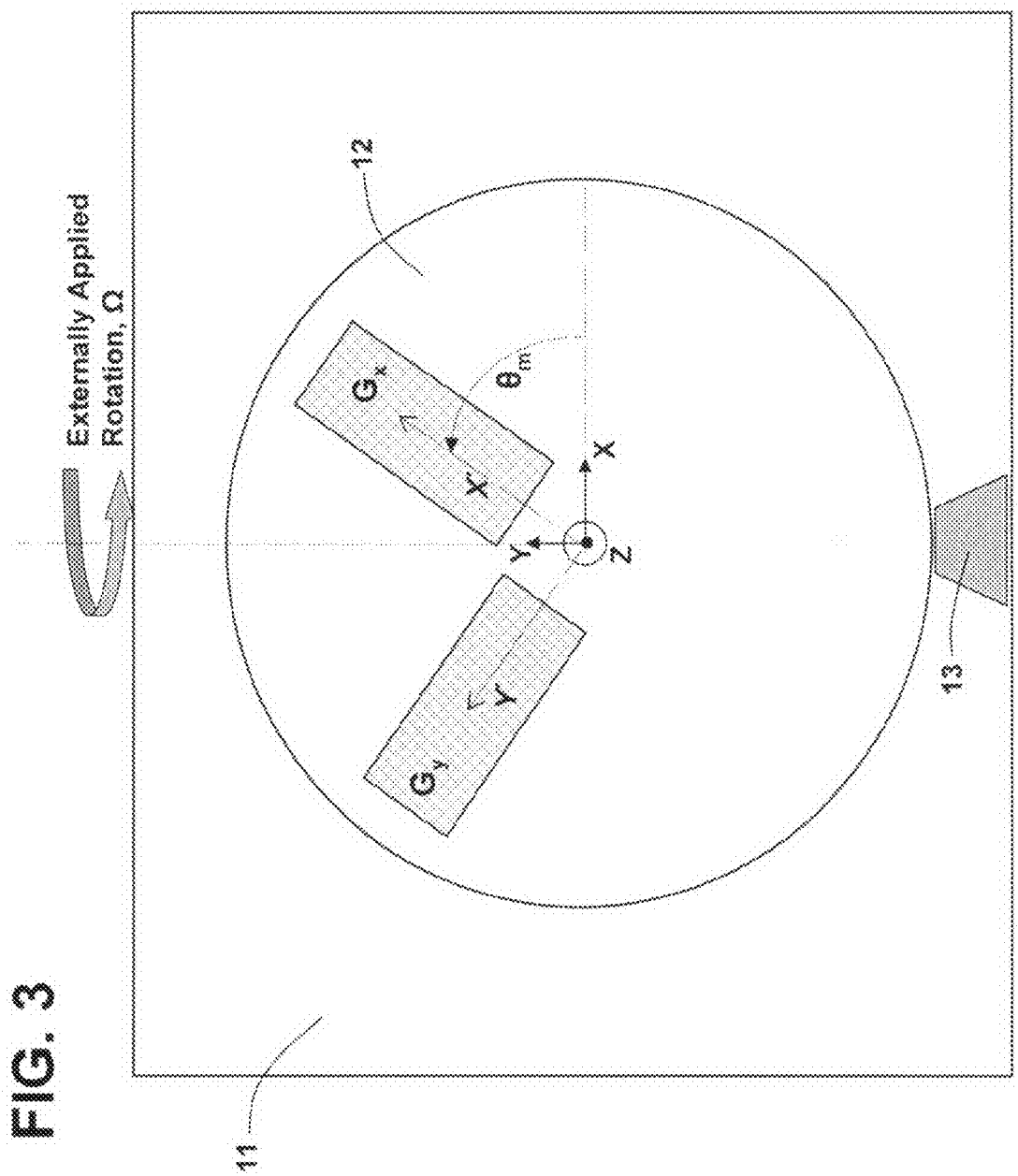
FIG. 3 is a top plan view of the embodiment of FIG. 1.

In FIG. 3, the input axes x', y' of the rate sensors or gyros are shown as being rotated by an angle $\theta_m$ with respect to the fixed reference axes x, y of the base. The z-axis is perpendicular to the plane of the figure, and an external rate of rotation $\Omega$ is applied to the entire system, including the base, about the y-axis.

The modulator oscillates about the z-axis with an amplitude which is typically on the order of 2 milliradians to 20 degrees or more and a frequency on the order of 0.01 to 20 Hertz, depending upon the type of dither motion to be applied, with higher frequencies of oscillation typically being associated with smaller amplitudes of oscillation. Two-point indexing dither (square wave in angle with respect to time) will, for example, make use of low frequency dither and high angular displacement.

Sensor 13 detects the instantaneous value of $\theta_m$ and provides a signal which is used in processing the output signals from the gyros. That signal allows the system to compensate for the time-varying input axes of rate sensors $G_x$ and $G_y$, as well as being used in demodulating the gyro outputs.

The rate sensors or gyros should have a suitable bandwidth for measurements at the frequency of the input axis modulation, and they should also have low enough noise in the frequency range near the modulation frequency to permit the gyro modulation signals to be adequately resolved.

Prior to demodulation, the output of each rate sensor or gyro consists of a combination of the sensor fixed offset and the externally applied angular rate. Since the modulation affects the applied angular rate, but not the fixed offset, the system is able to distinguish between them.

With the two signals being affected differently by the modulation of the input axis, relatively simple signal processing can be used to separate the two signals, producing a gyro output that is substantially free from the typical effects of gyro offset error or bias. The signal from the modulation sensor, which corresponds to the instantaneous orientation of the axes, is used in conjunction with an input axis demodulator in the processing circuit to remove the effect of the mechanical modulation.

The outputs of the X and Y gyros on a stationary, leveled plane on the earth can be expressed mathematically, up to the second-order terms, by the following equations:

$$\begin{cases} \omega_x = \Omega_N \cos(\Psi + A\sin\omega t) + B_x + v_x, & (1.1) \\ \quad = \Omega_N \left\{ \begin{array}{l} \cos\Psi\left[1 - \frac{1}{4}A^2(1 - \cos2\omega t)\right] - \\ A\sin\Psi\sin\omega t \end{array} \right\} + B_x + v_x, \\ \omega_y = -\Omega_N \sin(\Psi + A\sin\omega t) + B_y + v_y, \\ \quad = \Omega_N \left\{ \begin{array}{l} \sin\Psi\left[1 - \frac{1}{4}A^2(1 - \cos2\omega t)\right] - \\ A\cos\Psi\sin\omega t \end{array} \right\} + B_y + v_y \end{cases}$$

where $\Psi$ is the true heading of the x-axis gyro; $\Omega_N$ is the north component of earth rotation rate at given latitude; A is the modulation amplitude; $\omega$ is the dither angular frequency ($2\pi f$); and $B_i$ and $v_i$ are bias and (Gaussian) random errors of the ith-gyro, respectively.

Extracting the fundamental (i.e., first harmonic) and the second harmonic components from equations (1.1) gives separate frequency terms as follows:

First Harmonic:

$$\begin{cases} H_\omega(\omega_x) = -\Omega_N A\sin\Psi\sin\omega t, & (1.2) \\ H_\omega(\omega_y) = -\Omega_N A\cos\Psi\sin\omega t. \end{cases}$$

Second Harmonic:

$$\begin{cases} H_{2\omega}(\omega_x) = \frac{1}{4}\Omega_N A^2 \cos\Psi\cos2\omega t & (1.3) \\ H_{2\omega}(\omega_y) = \frac{1}{4}\Omega_N A^2 \sin\Psi\cos2\omega t. \end{cases}$$

In equations (1.2) and (1.3), the bias term $B_i$ is not modulated and, therefore is washed out or cancelled, as expected. The noise term $v_i$, however, is not cancelled, and is preferably removed by filtering prior to demodulation. If the noise term is excessive, there will be insufficient resolution of the modulated terms and performance of the sensors may be degraded in, for example, trying to determine heading during an alignment phase.

Sensitivity to misalignment of the gyro input axes with respect to the plane of the dither motion can become a source of error in bias cancellation. A component of the sensor input axes along the dither axis results in some of the dither motion being detected by the gyro. This error term can be quite large compared to the modulation signals to be measured. Misalignment often needs to be kept to as little as 10 μrad, which can be very challenging in a mechanical system.

With the mechanical modulation or dither motion about the z-axis in the embodiment of FIGS. 2 and 3, the dither rate vector is given by:

$$D^d \equiv (0 \; 0 \; A\omega \cos \omega t)^T.$$

Due to possible misalignment angles $\delta\theta_x$ and $\delta\theta_y$ about the z-axis with respect to the x- and y-axes, the dither angular velocity may be transformed to the x- and y-axes using the misalignment matrix $\delta C_d^b$:

$$D^b = \delta C_d^b D^d = \begin{pmatrix} \cos\delta\theta_y & \sin\delta\theta_x \sin\delta\theta_y & \cos\delta\theta_x \sin\delta\theta_y \\ 0 & \cos\delta\theta_x & -\sin\delta\theta_x \\ -\sin\delta\theta_y & \sin\delta\theta_x \cos\delta\theta_y & \cos\delta\theta_x \cos\delta\theta_y \end{pmatrix} \begin{pmatrix} 0 \\ 0 \\ A\omega\cos\omega t \end{pmatrix},$$

$$= \begin{pmatrix} \cos\delta\theta_x \sin\delta\theta_y A\omega\cos\omega t \\ -\sin\delta\theta_x A\omega\cos\omega t \\ \cos\delta\theta_x \cos\delta\theta_y A\omega\cos\omega t \end{pmatrix}$$

Since the dither frequency $\omega = 2\pi f$ creates a relatively high angular rate compared to earth rate, the effect of dither misalignment cannot be ignored. Taking the x and y components, we get the misaligned dither rates with respect to x-, y- and z-axes as follows:

$$\begin{cases} D_x = \cos\delta\theta_x \sin\delta\theta_y A\omega\cos\omega t, \\ D_y = -\sin\delta\theta_x A\omega\cos\omega t \end{cases} \tag{1.4}$$

Figure 4:
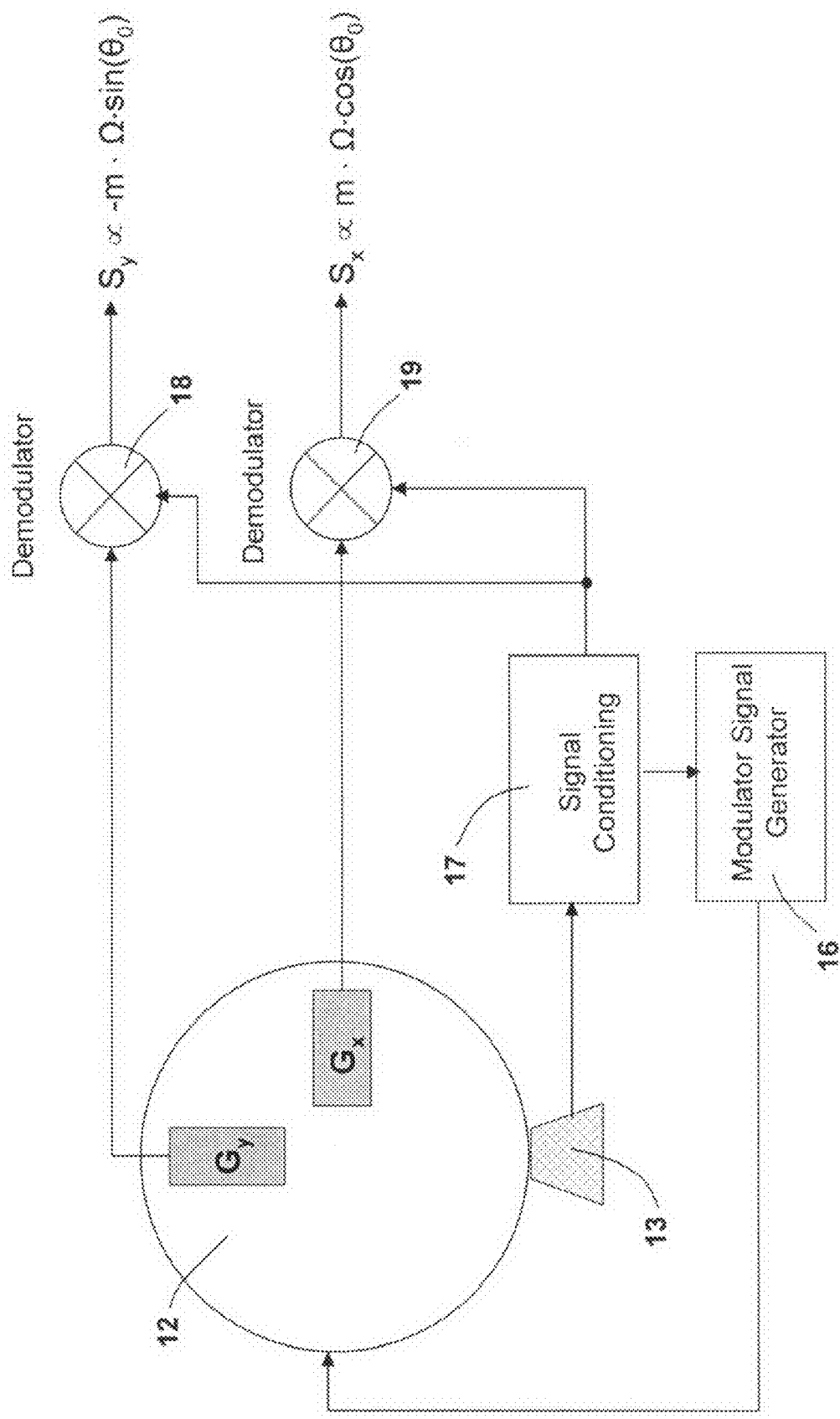
FIG. 4 is a block diagram of the embodiment of FIG. 2 with one embodiment of a system for processing signals from the rate sensors in accordance with the invention.

An embodiment utilizing first harmonic demodulation for bias cancellation is illustrated in the FIG. 4. In this embodiment, modulator 12 is driven by a signal generator 16 which includes an automatic gain control (AGC) circuit. The output of modulation sensor 13 is processed in a conditioning circuit 17, and the conditioning circuit provides a feedback signal to the AGC circuit in the signal generator to maintain the amplitude of the modulation at a constant level. As in FIG. 2, the externally applied rotation Ω is about an axis in the plane of the input axes of the two gyros.

The outputs of the two gyros are applied to the inputs of a pair of demodulators 18, 19, and the output of signal conditioning circuit 17 is applied as a phase reference to the two demodulators. The outputs of the demodulators are the signals $S_x$ and $S_y$ from which the values of applied rotation Ω and the angle of orientation $\theta_0$ are determined, and by using equations (1.2), for example, the north component of earth rotation rate $\Omega_N$ can be estimated.

Output signals $S_x$ and $S_y$ can be fed to analog signal processing circuitry (not shown) to provide an analog output signal corresponding to the applied external rotation Ω, or they can be converted to digital form and processed digitally for filtering, compensation of errors, and output. Alternatively, the gyros and the signal conditioning circuit can provide digital outputs, and demodulators 18, 19 can be digital as well.

Signals $S_x$ and $S_y$ are subject to corruption by misalignment induced rate errors if the phase reference is not adequately defined or controlled, and misaligned dither rates can directly disturb the first harmonic terms given by equations (1.2). Combining equations (1.2) with the misalignment dither rates in equations (1.4) with respect to the x- and x-axes, rectifying each component by cos ωt and sin ωt along each axis, and taking their DC components gives the following relationships:

$$\begin{cases} \langle[H_\omega(\omega_x) + D_x]\cos\omega t\rangle_\omega = \frac{1}{2}\cos\delta\theta_x \sin\delta\theta_y A\omega, \\ \langle[H_\omega(\omega_x) + D_x]\sin\omega t\rangle_\omega = -\frac{1}{2}\Omega_N A\sin\Psi, \\ \langle[H_\omega(\omega_y) + D_y]\cos\omega t\rangle_\omega = -\frac{1}{2}\sin\delta\theta_x A\omega, \\ \langle[H_\omega(\omega_y) + D_y]\sin\omega t\rangle_\omega = -\frac{1}{2}\Omega_N A\cos\Psi, \end{cases} \tag{1.5}$$

where the bracket $\langle \; \rangle_\omega$ denotes a time-average such that $$\langle\varphi(t)\rangle_\omega \equiv \frac{1}{T_0}\int_0^{T_0} \varphi(t) dt$$

where $\phi(t)$ is a periodic function whose period is given by $T_0 = 2n\pi/\omega$. Thus, the set of equations in (1.5) represents the mathematical principle of first harmonic bias cancellation in which the misalignment induced errors are demodulated by a particular phase of the dither reference signal (in this example, cosine rectification), whereas the desired earth rate signal is demodulated by the phase of the dither reference signal 90° out-of-phase with respect to the misalignment signal (i.e., sine rectification). As shown in equations (1.5), the first harmonic technique can be used for autonomously calibrating the gyro misalignment angles. This feature is very desirable for autonomous alignment and field calibration of stand-off weapons, among other applications.

From equations (1.5), it can be seen that an arbitrary phase reference signal will result in an output signal that is a superposition of the desired rate signal and the misalignment induced error signal. In the present invention this is overcome by using a demodulation phase reference adjusted for minimum coupling of the misalignment signal. This means that the phase is adjusted to be in quadrature with respect to the phase that would output the maximum misalignment error signal, i.e., sin ωt demodulation versus cos ωt demodulation.

Figure 5:
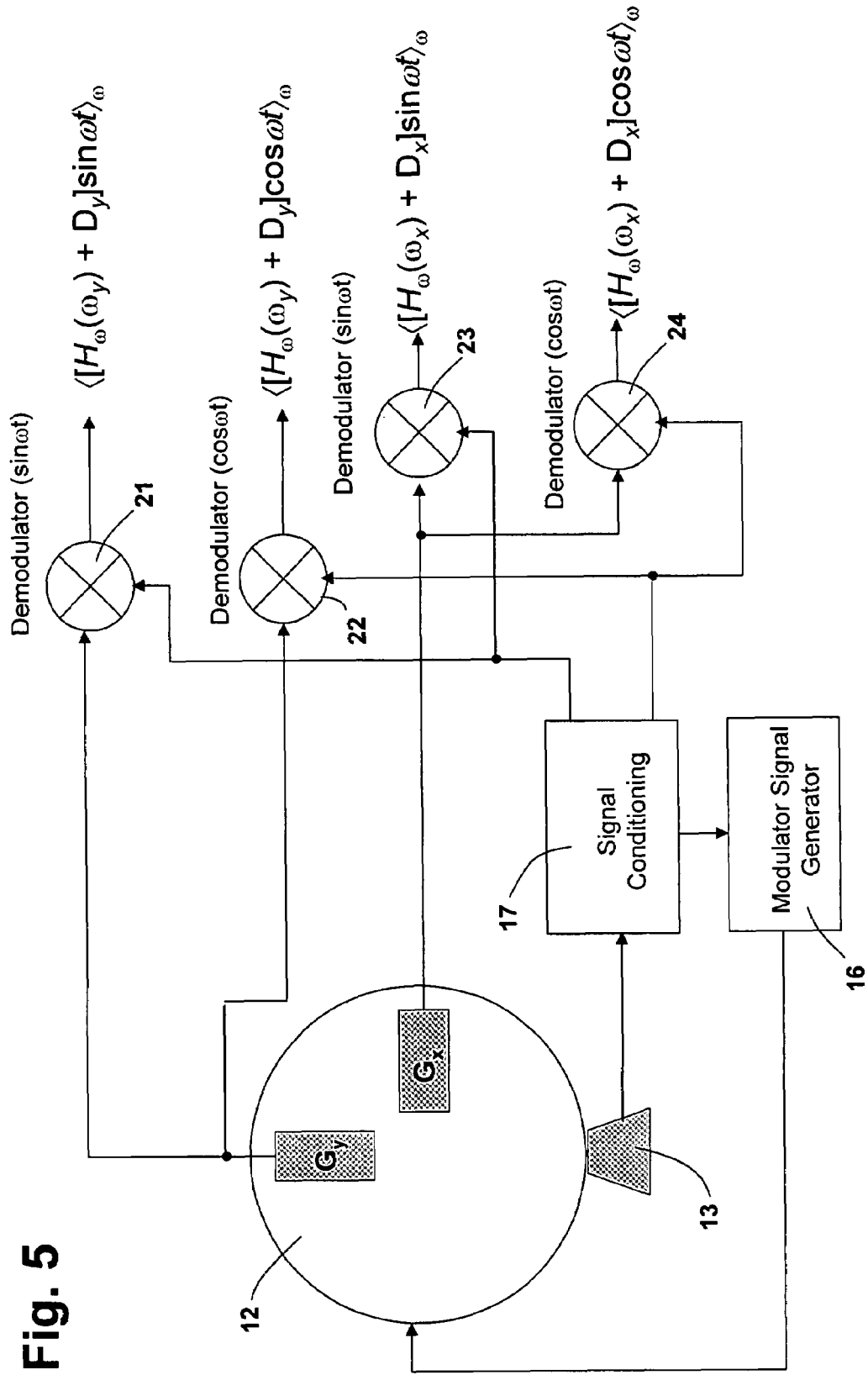
FIG. 5 is a block diagram of the embodiment of FIG. 2 with another embodiment of a system for processing signals from the rate sensors in accordance with the invention.

FIG. 5 illustrates an embodiment in which two demodulations (sin ωt and cos ωt) are performed. When properly calibrated, the demodulated outputs provide estimates of the quantities in equations (1.5) and permit determination of both the heading (Ψ) and the misalignment errors ($\delta\theta x$ and $\delta\theta y$).

As illustrated in FIG. 5, two gyros $G_x$ and $G_y$ are mounted on a modulator 12 that oscillates about an axis substantially perpendicular to the input axes of the two gyros. The modulator is driven by a modulation signal generator 16 which controls the amplitude of the modulation by means of a feedback signal from the modulator sensor 13 and signal conditioning circuit 17. The feedback signal is used by the modulation signal generator to adjust the modulation signal to maintain a constant amplitude of modulation. Externally applied components of rotation, such as $\Omega_N$, lie in the plane of the modulation.

Signal conditioning circuit 17 provides sin ωt phase reference signals to demodulators 21, 23 and cos ωt phase reference signals to demodulators 22, 24. The output of gyro $G_y$ is applied to demodulators 21, 22, and the output of gyro $G_x$ is applied to demodulators 23, 24, with the demodulators providing the four signal outputs corresponding of equations (1.5). Additional signal processing can be performed on these signals to compute $\Omega_N$, heading $\Psi$ and misalignment errors $\delta\theta x$ and $\delta\theta y$. If necessary, adjustments to the phase of the two phase reference signals can be made in the signal conditioning.

Although the modulator 12 and modulator pickoff 13 are depicted as being external to gyros $G_x$, $G_y$, they can also be integrated into the sensing elements themselves or into the sensing element packages such that only the sensing elements are dithered as opposed to the entire gyro. This can be significant when the size and mass of the total gyro package is significantly greater than the size and mass of either the sensing elements or sensing element packages. A system of three independently dithered gyros or angular rate sensors can be assembled using three dithered sensors of the type illustrated. Integration of the modulator into the sensing element package or as a part of the sensing element structure is particularly suitable for very small gyro sensing elements such as MEMS devices which are produced from quartz or silicon wafers using micro-electromechanical techniques. MEMS devices without built-in modulators which are already in production for a variety of applications could be made suitable for higher accuracy applications by combining them with the bias cancellation techniques of the invention. Such a gyro with integrated mechanical modulation can provide improved accuracy by cancelling bias offset without significant cost or size penalties.

Figure 6:
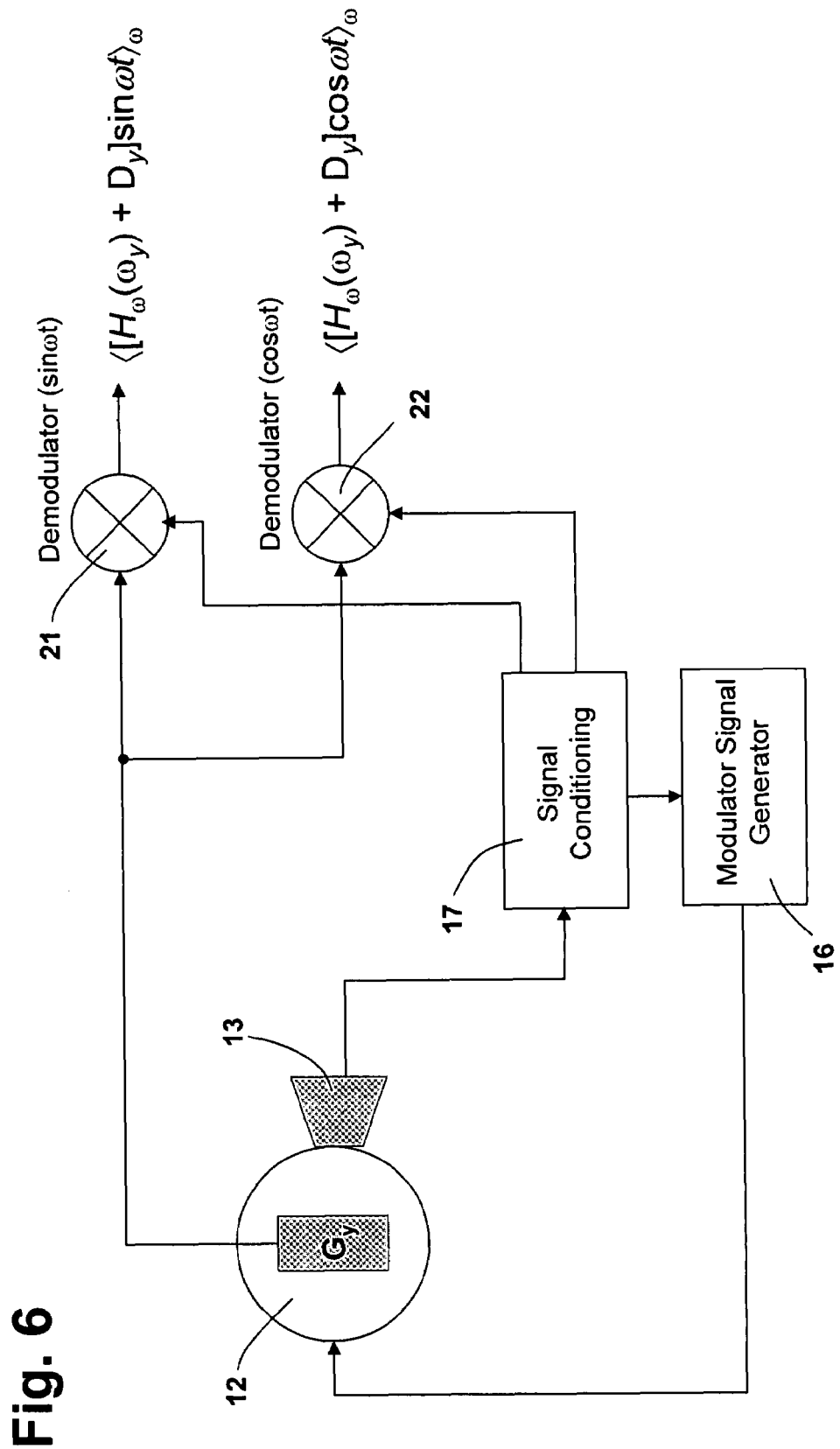
FIGS. 6 and 7 are block diagrams of additional embodiments of an inertial rate system with gyro bias washout modulation and means for processing signals from the rate sensors in accordance with the invention.

The embodiment of FIG. 6 is similar to the embodiment of FIG. 5 except that the modulator dithers only a single gyro. The other features of this embodiment are the same as in the preceding one.

Unlike the first harmonic signals, the second harmonic signals in equations (1.3) are not affected by misalignment of the gyro input axes with respect to the dither rate because in this case the signal of interest is at twice the modulation frequency, i.e., 2ω. The second harmonic terms demodulated by cos(2ωt) are:

$$\begin{cases} H_{2\omega}(\omega_x)\cos 2\omega t = \frac{1}{4}\Omega_N A^2 \cos\Psi \cos^2 2\omega t = \frac{1}{8}\Omega_N A^2 \cos\Psi(1 + \cos 4\omega t) \\ H_{2\omega}(\omega_y)\cos 2\omega t = \frac{1}{4}\Omega_N A^2 \sin\Psi \cos^2 2\omega t = \frac{1}{8}\Omega_N A^2 \sin\Psi(1 + \cos 4\omega t) \end{cases}$$

and the dc component of these are:

$$\begin{cases} \langle H_{2\omega}(\omega_x)\cos 2\omega t\rangle_{2\omega} = \frac{1}{8}\Omega_N A^2 \cos\Psi, \\ \langle H_{2\omega}(\omega_y)\cos 2\omega t\rangle_{2\omega} = \frac{1}{8}\Omega_N A^2 \sin\Psi. \end{cases} \quad (1.6)$$

The response of the gyros at twice the dither frequency may not be in-phase with respect to the cos(2ωt) demodulation reference signal. This may be caused by changes in the gyro phase response at the frequency $f=\omega/\pi$ and is discussed further below.

Figure 7:
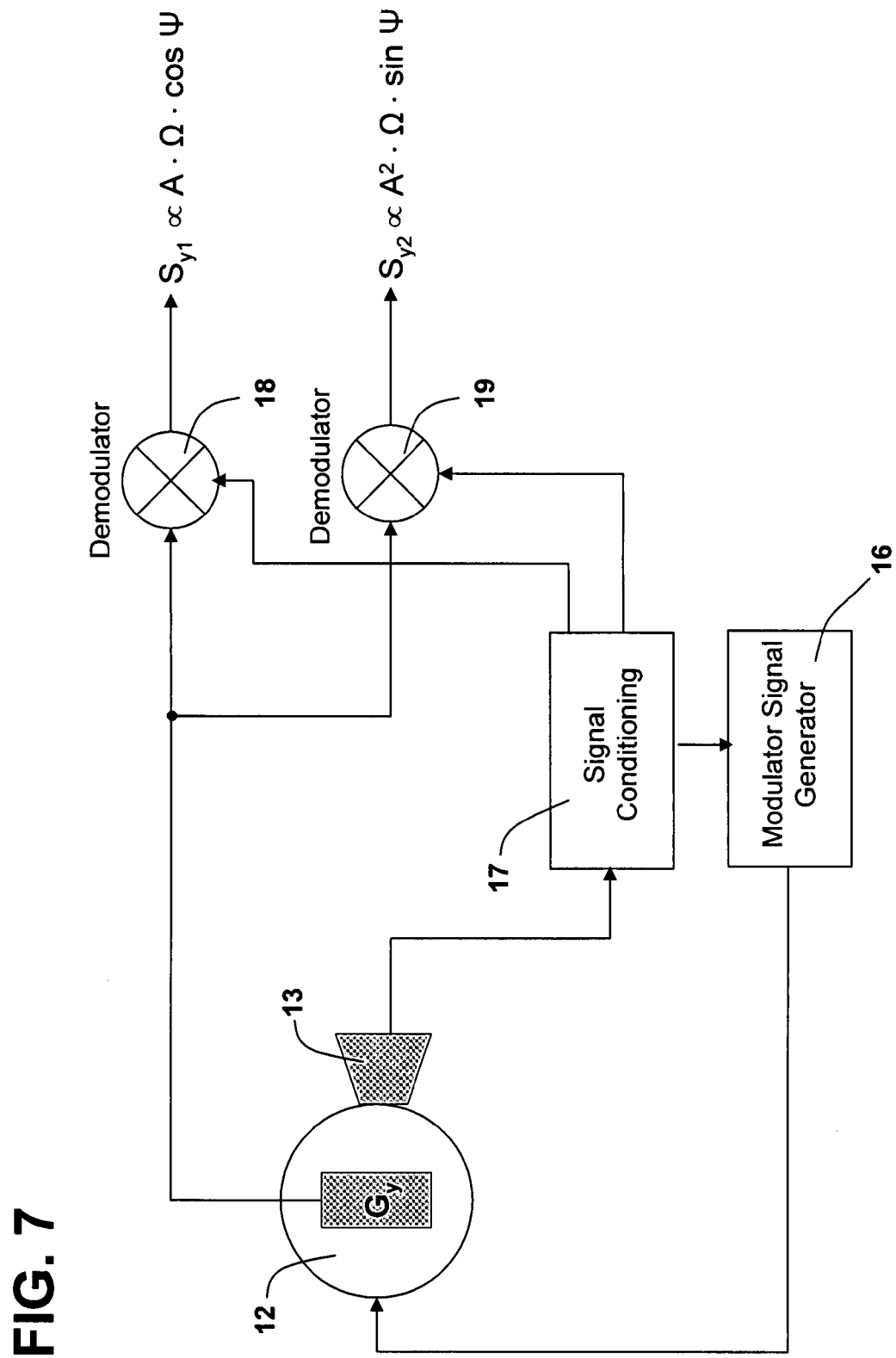

An embodiment utilizing second harmonic demodulation is illustrated FIG. 7. This embodiment is similar to the embodiment of FIG. 4 except that only a single gyro $G_y$ is used, and signal processing circuit 17 provides two frequency reference outputs. One of those outputs has a frequency of $\omega/2\pi$ and is equivalent to the reference signal applied to the demodulators in the embodiment of FIG. 4. It is applied to the reference input of demodulator 18. The other output has a frequency of $\omega/\pi$, which is twice the modulation frequency, and is applied to the reference input of demodulator 19. The output of gyro $G_y$ is applied to the signal inputs of both demodulators. As in the embodiment of Figure, a modulator feedback signal from sensor 13 and signal conditioning circuit is applied to modulation signal generator 16 for use in controlling the amplitude of the modulation signal.

Demodulator 18 operates in the same manner as the corresponding demodulator in the embodiment of FIG. 4. Demodulator 19 operates at twice the modulator frequency and converts the gyro output signal into a signal roughly proportional to the values in equations (1.6), i.e., second-order in the modulation amplitude A.

As in the case of first harmonic demodulation, the second harmonic technique can be enhanced by using two phase references in phase quadrature, e.g., sin 2ωt in addition to cos 2ωt. While all of the desired signal may be obtained using one reference, e.g. cos 2ωt, phase shifts in the system may cause some of the signal to be in phase with the other term, sin 2ωt.

The combination of the two second-order demodulation products provides the basis for improved second harmonic bias cancellation. The second harmonic technique has the advantage of being insensitive to misalignment, but it also has the disadvantage of much weaker modulation amplitude since it is a second-order effect. However, this disadvantage can be overcome by adapting the dither modulation frequency to the specific frequency response characteristics of the gyro being modulated. Some gyros and angular rate sensors do not have constant output sensitivity versus frequency. For example, Coriolis vibratory rate sensors such as quartz tuning fork sensors and micromachined silicon inertial sensors often have an increased sensitivity at specific frequencies. This may correspond, for example, to the difference in frequency between the drive mode or Coriolis reference mode and the sense mode of oscillation.

Figure 8:
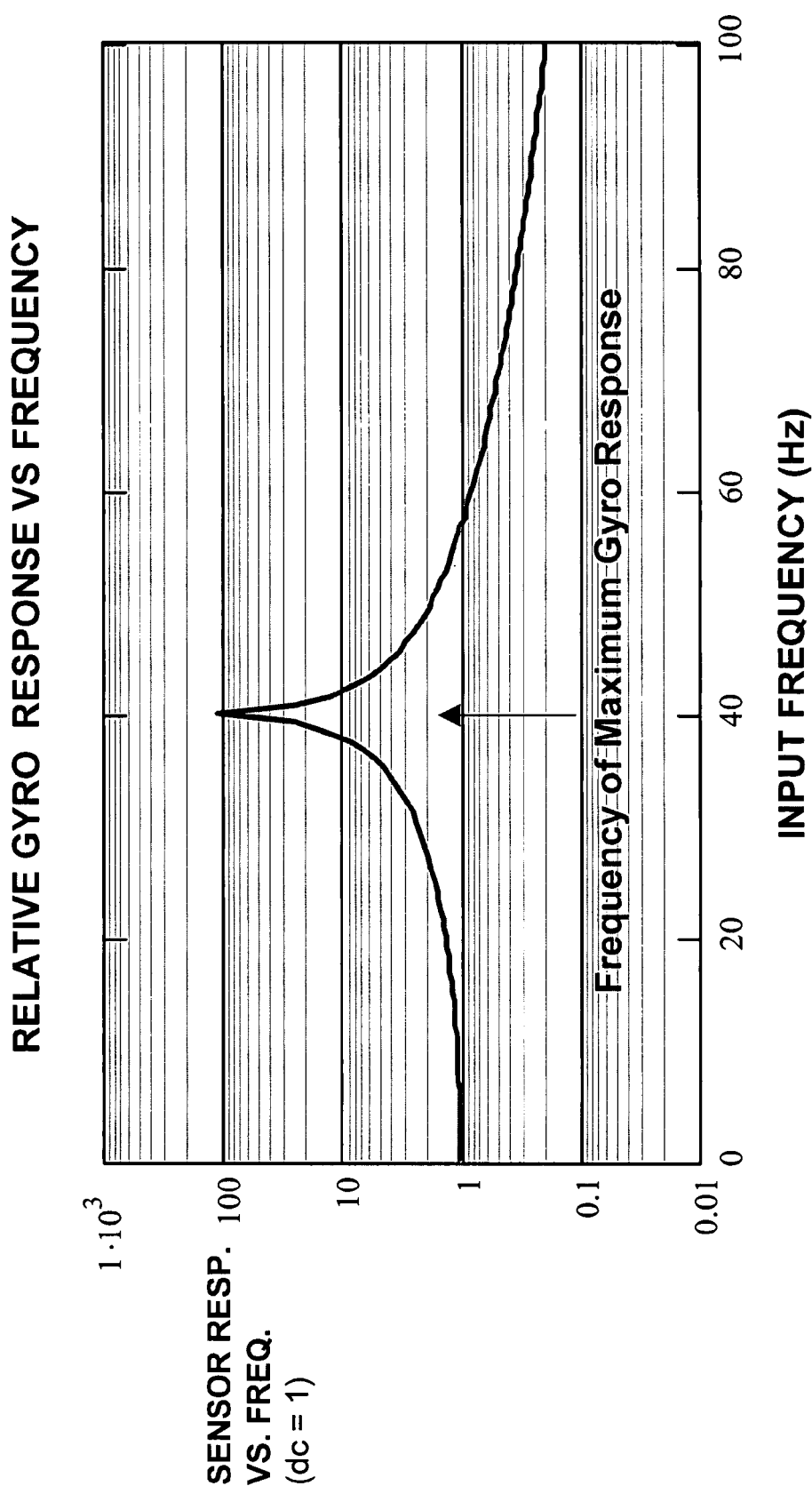
FIG. 8 is a graphical representation of the frequency response of one embodiment of a rate sensor or gyro employed in the invention.

FIG. 8 illustrates the frequency response of a high Q quartz tuning fork in graphical form. The example is for the case of a tuning fork with natural frequency of 11 kHz and Q-factor of 30,000. If such a sensor is modulated or dithered at a frequency of 20 Hz, the second harmonic signal will be amplified by two orders of magnitude relative to the dc response of the fork. The gain is nearly as great between the second and first harmonic signal amplification factors. With this technique, the second harmonic is selectively amplified with a corresponding improvement in resolution of the modulation signal.

Since this type of amplification arises due to the resonant characteristics of the sense mode of the tuning fork, a variable phase shift of the modulated signal will result, depending on the difference in frequency between twice the dither frequency and the peak-response frequency of the tuning fork. This phase shift is approximately 90° when the frequencies are matched but can vary significantly for small mismatches in frequency.

As mentioned above, the use of two demodulators with phase references in phase quadrature (e.g., sin 2ωt and cos 2ωt) improves the performance of the second harmonic technique. The total amplitude of response can be made insensitive to small frequency changes by calculating the root sum square (RSS) of the two demodulation products, specifically, $([H_{2\omega}<\omega_y)]\sin 2\omega t>_{2\omega}$ and $<[H_{2\omega}(\omega_y)]\cos 2\omega t>_{2\omega}$, as shown in FIG. 6.

In addition, the relative amplitudes of the two demodulation products can be used to adjust the dither frequency to keep it adjusted to one-half of the peak response frequency, thereby maintaining maximum response even if the peak response frequency varies, for example, over temperature.

Figure 9:
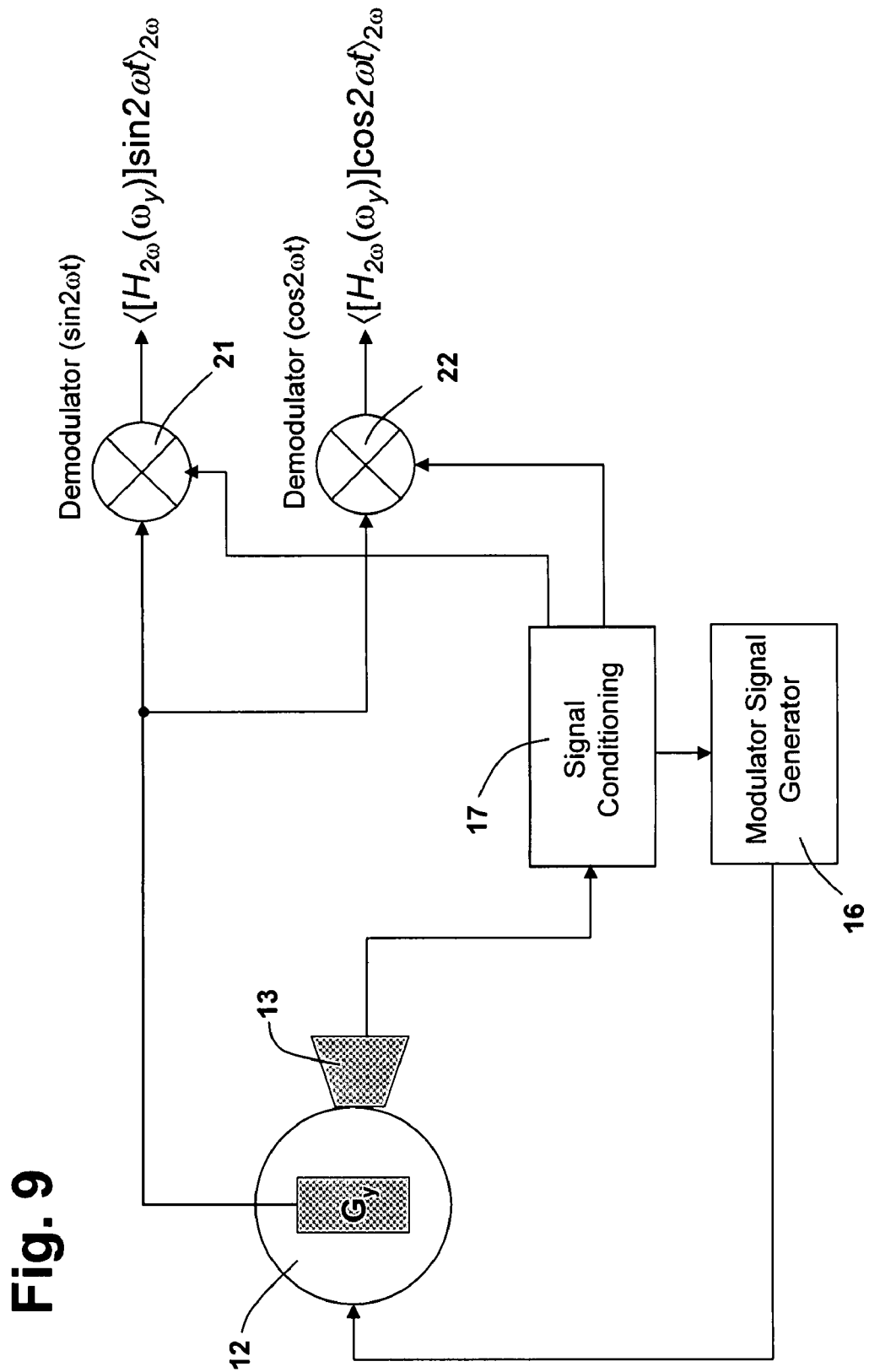
FIGS. 9-12 are block diagrams of additional embodiments of inertial rate systems with gyro bias washout modulation and means for processing signals from the rate sensors in accordance with the invention.

An embodiment with improved second harmonic sensor modulation and demodulation with a single gyro is shown in FIG. 9. Gyro $G_y$ is mounted on a modulator 12 which oscillates about an axis substantially perpendicular to the input axis of the gyro. The modulator is driven by a modulation signal generator 16 which controls the amplitude of the modulation by means of a feedback signal from modulation sensor 13 and signal conditioning circuit 17. The feedback signal is used by the modulator signal generator to adjust the modulation signal to maintain a constant amplitude of modulation. The component of externally applied rotation to be measured $\Omega$ lies in a plane perpendicular to the dither axis of the modulator.

The signal conditioning circuit provides a first output signal sin 2ωt which is applied to demodulator 21 as a phase reference and a second output signal cos 2ωt which is applied to demodulator 22 as a phase reference. The gyro output is fed into both of the demodulators to provide the two signal outputs, as shown. Additional signal processing can be performed on these signals to estimate the component of $\Omega$ parallel to the average orientation of the input axis of the gyro. Two such gyros mounted in a nominally orthogonal relationship as in FIG. 5, but using second harmonic demodulation can be used to estimate heading $\Psi$.

Figure 10:
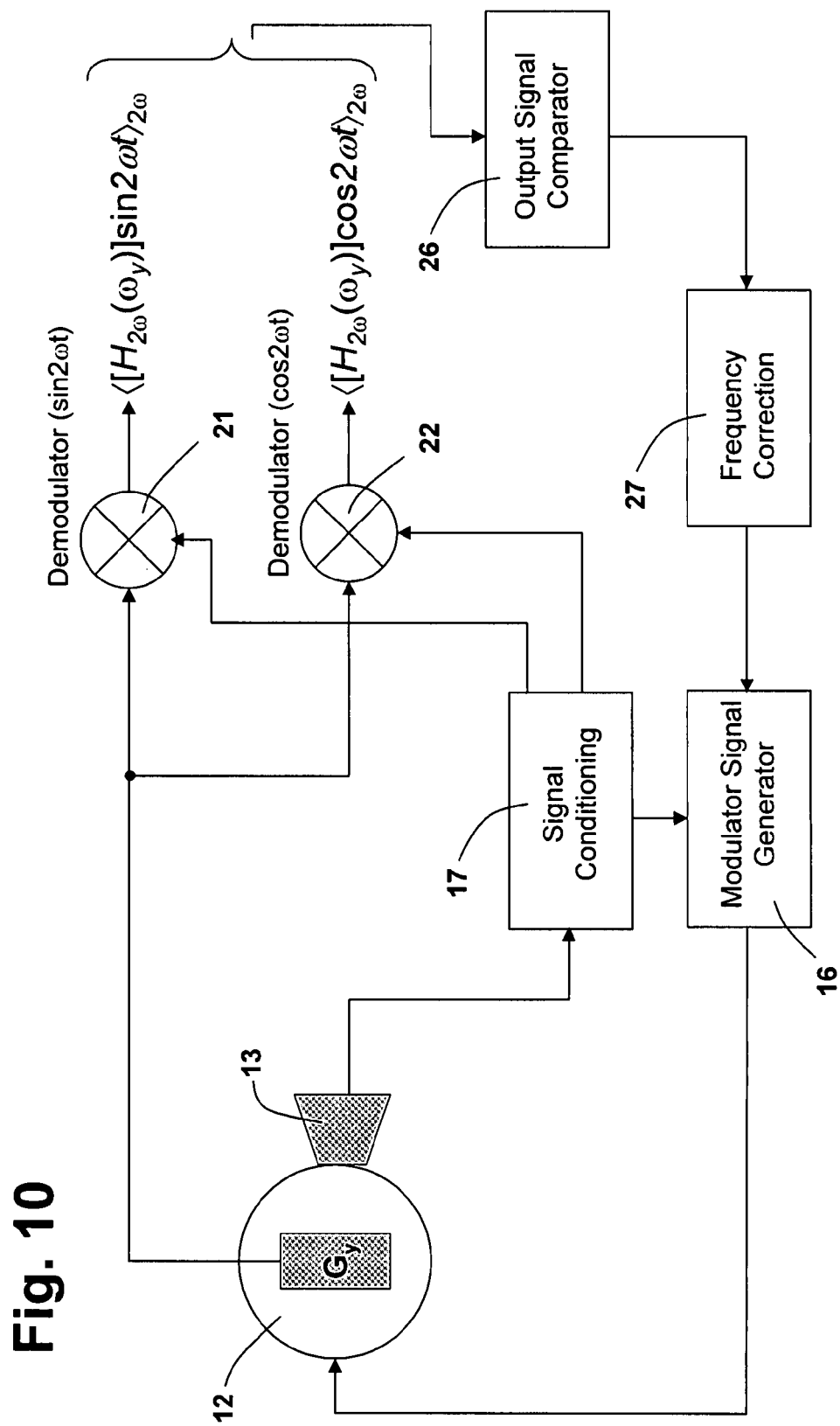

The embodiment FIG. 10 is similar to the embodiment of FIG. 9 with the addition of an output signal comparator 26 and a frequency correction circuit 27. The output signals from demodulators 21, 22 are applied to the comparator, and the output of the comparator is applied to the frequency correction circuit, which applies a correction signal to modulation signal generator 16. By adjusting the modulation frequency, the ratio of the two output signals can be maintained at a constant value, and the circuit can track changes in the difference frequency between the driven mode of oscillation and the sense mode for a Coriolis vibratory gyro.

Either first or second harmonic demodulation provides a means to estimate sin $\Psi$ and cos $\Psi$ and thereby to estimate the heading angle $\Psi$ itself, and both types of demodulation can be used for the same gyro to improve the overall accuracy of the sensor or system.

Figure 11:
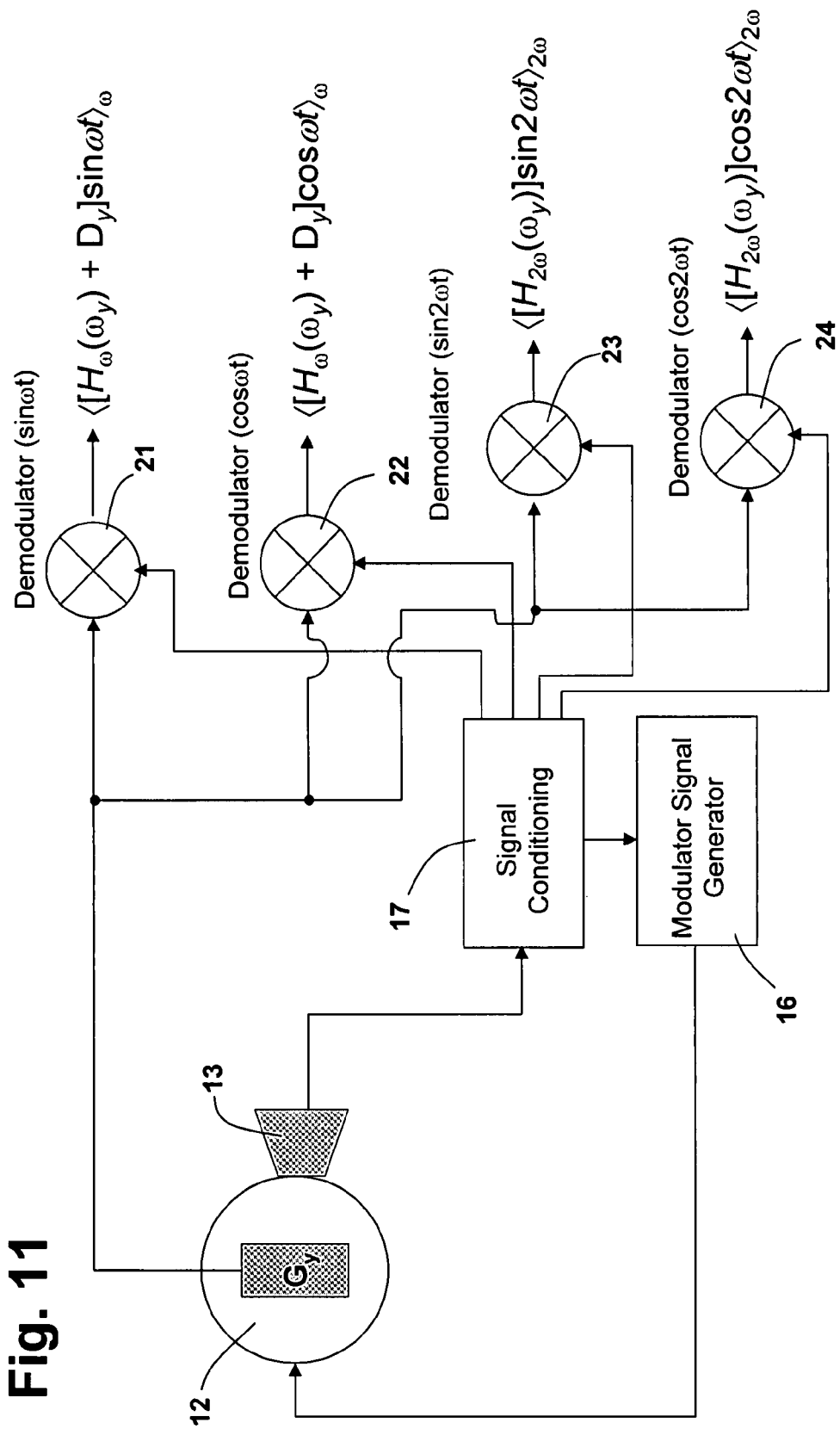

An embodiment utilizing both first and second harmonic sensor modulation and demodulation with a single gyro is shown in FIG. 11. This could also be done with a pair of sensors mounted in a nominally orthogonal relationship, as in the embodiment of FIG. 5. As in the other embodiments, gyro $G_y$ is mounted on a modulator 12 which oscillates about an axis substantially perpendicular to the input axes of the two gyros. The modulator is driven by a modulation signal generator 16 which receives a feedback signal from modulation sensor 13 and signal conditioning circuit 17. The feedback signal is used by the modulator signal generator to adjust the modulation signal to maintain a constant amplitude of modulation. The component of externally applied rotation to be measured $\Omega_N$ once again lies in a plane perpendicular to the dither axis of the modulator.

In this embodiment, the signal conditioning circuit generates four phase reference signals which correspond to sin ωt, cos ωt, sin 2ωt, and cos 2ωt, respectively. These signals are applied to the demodulators as phase references, with the sin ωt signal being applied to demodulator 21, the cos ωt signal being applied to demodulator 22, the sin 2ωt signal being applied to demodulator 23, and the cos 2ωt signal being applied to demodulator 24. The output of the gyro is fed into all four of the demodulators to provide the four signal outputs. Additional signal processing can be performed on these signals to estimate $\Omega_N$ and $\Psi$.

The output of the single gyro in the embodiment of FIG. 11 can be used for estimating both $\Omega_N$ and $\Psi$ since the first harmonic demodulation products provide an output proportional to $\Omega_N \cdot \cos \Psi$ (equations 1.5) for y-axis gyro while the second harmonic demodulation products provide an output proportional to $\Omega_N \cdot \sin \Psi$ (equations 1.6) for y-axis gyro. The amplitude of the dither (A in the above equations) is determined by the modulator signal generator 16. In the case of gyrocompassing, $\Omega_N$ in the locally level coordinate system may also be known.

A system of three independently dithered gyros or angular rate sensors can be assembled using three dithered sensors as shown here or as in FIGS. 6 and 9.

The value of such bias washout techniques is readily apparent in that relatively inexpensive gyros or rate sensors can be used in applications typically requiring much more expensive or bulky sensors.

The invention is particularly suitable for use in gyrocompassing applications where the angular velocity of the earth is used to determine north. In such applications, the apparatus is otherwise stationary, and the externally applied rotation is just the rotation of the earth. If the system is locally level, or if the inclination of the system is known by the use of accelerometers, the latitude can also be determined from the component of the earth's rate as measured by the gyros in the horizontal plane of the locally level system. Adjustment for the effect of the modulation amplitude A can be made in the calibration of the system.

As noted above, two key factors in bias cancellation utilizing the techniques disclosed herein are an adequate signal-to-noise ratio and a reduced sensitivity to misalignment of the sensors relative to the applied dither. While second harmonic modulation and demodulation definitely reduces the sensitivity to sensor misalignment, it can result in an inadequate signal-to-noise ratio unless selective amplification of the second harmonic modulation is employed, as described above. First harmonic modulation and demodulation will generally have a superior signal-to-noise ratio, but is inherently sensitive to misalignment of the sensors.

As discussed more fully hereinafter, the invention can be adapted to accurately determine the error in phase of the demodulation reference signals, thereby permitting those signals to be controlled for still further reduction in errors resulting from misalignment of the sensors.

As the analysis leading to equations (1.5) shows, it is possible to reject errors due to sensor misalignment to the dither modulation by providing the correct phase for demodulation. In equations (1.5), the demodulation waveform with the correct phase is sin ωt. The output obtained using this signal for demodulation is not corrupted by errors due to misalignment. The waveform in phase quadrature with the correct waveform is given by cos ωt, and the output obtained using this phase reference provides a signal proportional to the misalignment term.

In practical systems, modulator sensor signals will be subject to phase errors due to phase shifts in electronic circuits or to errors in the modulation sensor itself. Therefore, it may be necessary to apply a correction to the phase of the demodulation signals to obtain the ideal signals represented by sin ωt and cos ωt. A phase error of 1° in sin ωt will, for example, allow about 1.75% of the full misalignment rate error signal to be added to the true rate signal. Since the misalignment rate error signal can possibly be quite large relative to the rate signals to be resolved, a phase error of 1° or even significantly less may not be tolerable.

To further complicate the calibration of the system, the phase errors can potentially vary with time or as a function of temperature. Therefore, in a sensor or system requiring the maximum possible accuracy and resolution, these errors must be fully accounted for and compensated.

One method for controlling these phase errors is to perform an extensive calibration of phase, including effects due to temperature. This calibration is typically performed as a part of the manufacturing process. Once the phase errors have been determined, one of two methods for compensation can be used. In the first of these methods, the effect of the phase error is mathematically removed from the sensor output at some point after demodulation. This can be done by applying the inverse of the misalignment rotation matrix ($\delta C_d^b$) to the demodulation products in equations (1.5).

Figure 12:
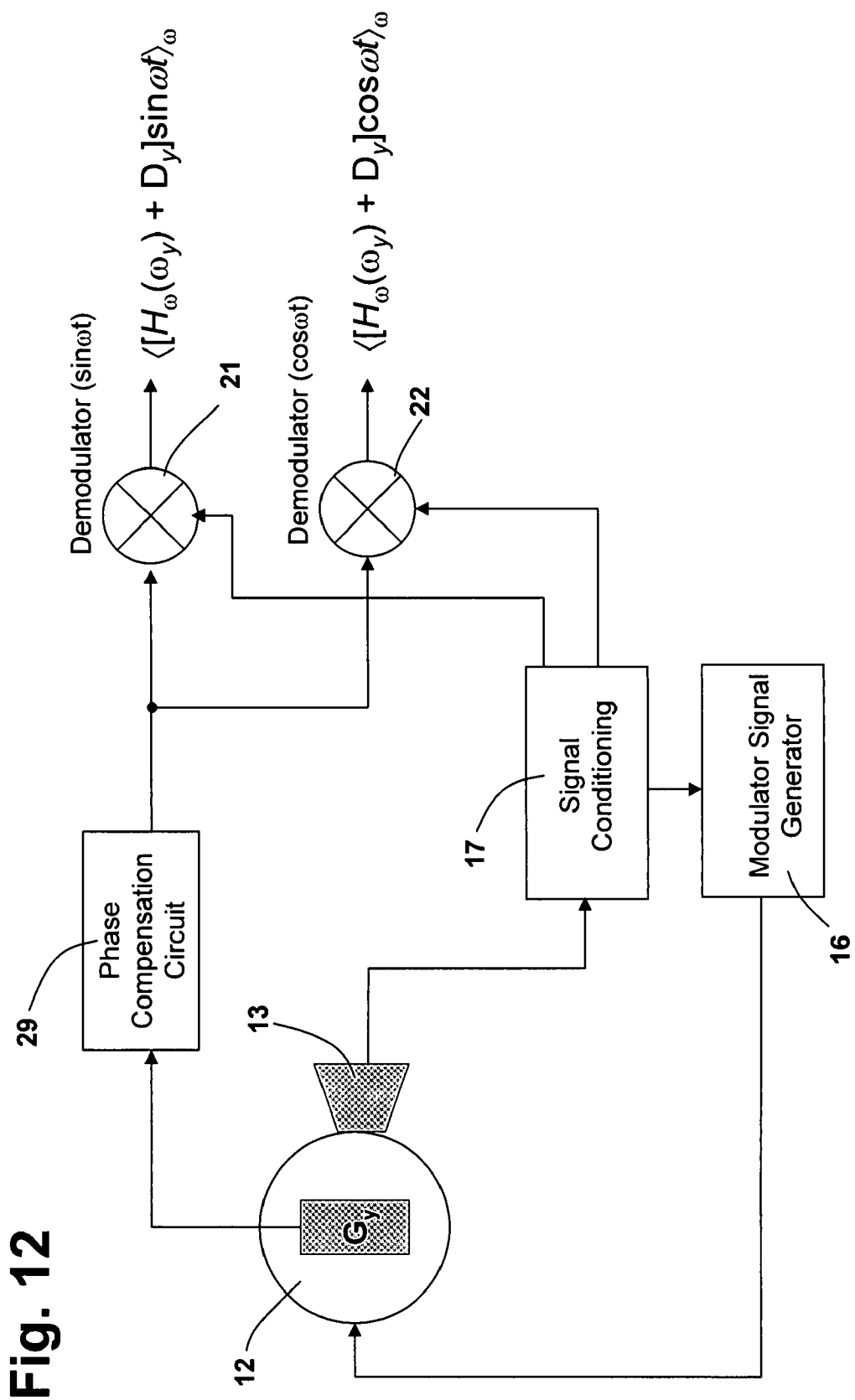

In the second of these methods, a phase correction signal is applied to a phase compensation circuit prior to demodulation such as illustrated in the embodiment of FIG. 12. This embodiment is similar to the embodiment of FIG. 6 with the addition of a phase compensation circuit 29 between the output of the gyro and the inputs of the demodulators. Alternatively, the phase correction could be performed in the signal conditioning circuit 17. The phase correction to be applied does not need to be static. It can, for example, be responsive to changes in temperature such that the phase compensation takes temperature change into account. Furthermore, the phase correction can be controlled by an analog or digital signal provided by the system in which the gyro is used. If the actual phase error is estimated by an algorithm within the system, the updated phase compensation signal can be applied on a continuous basis, accounting for changes in temperature, time and other factors.

In one embodiment of the invention, the actual misalignment and phase errors are calculated and suitable compensation is used to correct for these errors, using either of the methods described above. The determination of the phase errors is accomplished by applying a dither modulation consisting of two distinct frequency waveforms.

When two distinct frequencies are used in a first harmonic modulation waveform, the desired rate signal derived from each of the two frequency components will be proportional to the angular displacement associated with each of the frequency components. However, the misalignment signals associated with the two frequency components will not be equal, but rather will be proportional to the product of the angular displacement and the frequency. The two rate output signals and the two misalignment rate signals are used to compute the actual phase errors and misalignment terms. Correction signals or computations derived from the calculated phase errors are then used to remove the effects of these errors from the system output either before or after demodulation.

In a preferred embodiment of a sensor system with phase error calculation and compensation as described above, the waveform of one of the two frequency components is approximately a square wave in angle while the other is a sine wave. In this case, the modulator has sufficient dynamic response to provide a rapid movement approximating the desired square wave motion. Of course, the modulator cannot change angle instantaneously, so the rise time of the waveform corresponding to the transition from one angular position to the other is finite, although much less than the period of the waveform.

Figure 13A:
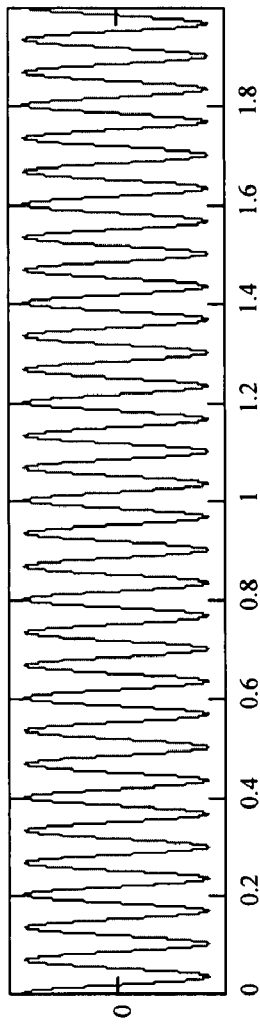
Figure 13:
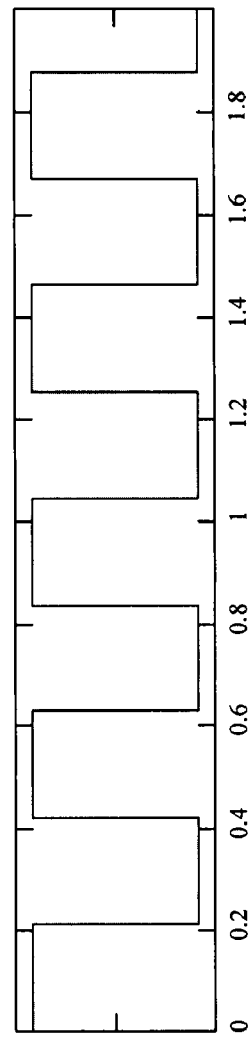
Figure 13C:
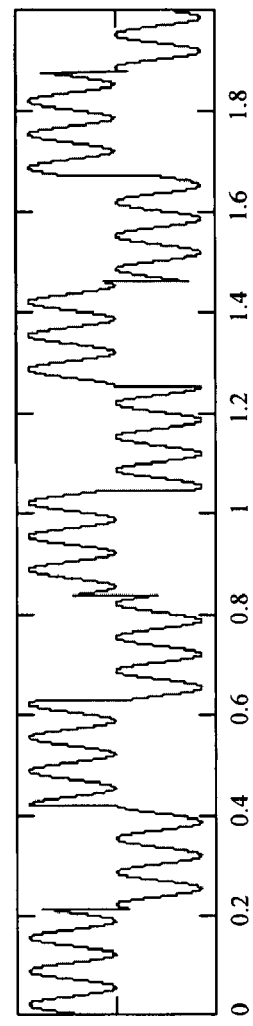

A two frequency waveform of the type discussed above is illustrated in FIGS. 13A-13C, with each waveform being shown separately in FIGS. 13A and 13B and the two being shown in combination in FIG. 13C. Although the relative magnitudes of the angular displacement of the two frequency components are shown as being roughly equal in this example, this is not a requirement.

One advantage of this type of two-frequency dither modulation is that the two waveforms perform complementary functions. The quasi-square wave dither (excluding the transition times) is not subject to rate errors induced by sensor misalignment because it is not changing in angle while at either extreme. Therefore, the output demodulated from this frequency component will be a true rate signal free of misalignment error and, hence, insensitive to phase errors as well. In order to exclude from the demodulation the very large rate signals that occur during the transition times, the demodulation can be inhibited during these intervals using a demodulation suppression signal as show in FIGS. 14A-14B. This signal guarantees that the large rate signal during the transition times is ignored or "zeroed" out during these intervals. The loss of this fraction of data is taken into account in the system signal-processing algorithm.

The sine wave dither signal, on the other hand, is subject to error due to misalignment. The difference in estimated rate between the two demodulated waveforms (square wave and sign wave) represents the misalignment induced error. The phase error associated with the sine wave demodulation, $\alpha_{sin}$, is given by:

$$\alpha_{sin} = \tan^{-1}(\Delta/M_{sin}),$$

where $\Delta$ is the difference in measured rate as determined using the two separate dither modulations and demodulations. This difference is $R_{sin} - R_{square}$, where "R" refers to the measured angular rate using one or the other of the modulation/demodulation methods. $M_{sin}$ is the total misalignment signal for the sine wave dither modulation which can be estimated, via cos ωt demodulation, using equations (1.5) since the effect of small phase errors on the relatively large misalignment induced signal is negligible.

This estimate of $\alpha_{sin}$ can be obtained on a continuous basis. The value of $\alpha_{sin}$ provides the necessary input for real time correction of the phase error using one of the methods given above, thereby minimizing misalignment errors in a first harmonic technique implementation of bias cancellation.

Figure 15:
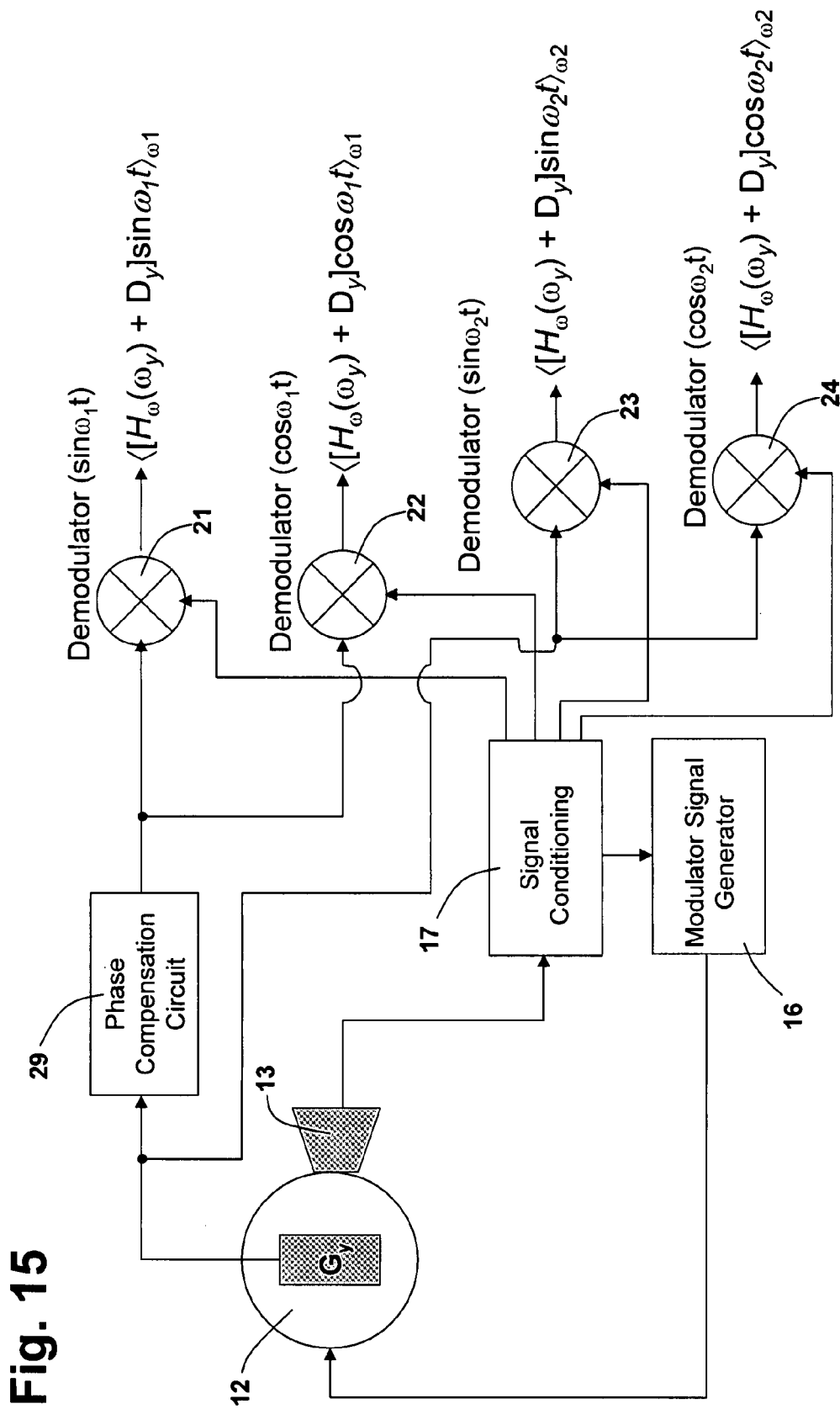
FIG. 15 is a block diagrams of an additional embodiment of an inertial rate system with gyro bias washout modulation and means for processing signals from the rate sensors in accordance with the invention.

FIG. 15 illustrates an embodiment which utilizes such two frequency first harmonic demodulation. This system is similar to that of FIG. 11 except that the square wave signal at angular frequency $\omega_2$ is demodulated instead of the second harmonic.

In the embodiment of FIG. 15, modulator signal generator 16 generates the sine and square dither waveforms at separated frequencies and applies these two signals to modulator 12. The modulation sensor 13 delivers a dither amplitude signal to the signal conditioning circuit 17, and that circuit provides a feedback signal to the modulation signal generator 16, which is used to control the dither amplitudes to predetermined values, with the two frequencies of dither being separately controlled. The signal conditioning block also provides four phase reference signals, two of which are in phase quadrature at the sine dither frequency, $\omega_1$, and two of which in phase quadrature at the square wave dither frequency, $\omega_2$. The initial phase calibration of the system is such that the sine phase references approximately correspond to the proper phase for demodulating the desired rate offset, although they may contain small phase errors. The difference in measured rate $\Delta$ is calculated using the appropriately scaled outputs of demodulators 21, 23. $M_{sin}$ is calculated using the output of demodulator 22, also appropriately scaled. The appropriate scaling takes into account the amplitude and frequency difference between the two dither signals (square versus sine) as well as a factor of $4/\pi$ to account for the first harmonic content of a square wave versus a sine wave.

The phase error associated with the $\omega_1$ reference signals is calculated using the equation provided above and compensated using phase compensation circuit 29 or directly in the signal conditioning circuit as a phase adjustment to the reference signals.

The sine wave dither signal provides uninterrupted output, with no demodulation suppression being required. Therefore, there is no frequency response penalty for this signal as there could be when only square wave dither is used.

If a single frequency of dither is required for some applications, the two frequency method can still be used during an alignment phase to calibrate the phase error for sine demodulation. Alternatively, the square wave and sine wave dither can be used one at a time in sequence to accomplish the same thing, i.e., system alignment or initialization. In this case it is possible to use a single pair of demodulators that are capable of operating at either of the two frequencies, with the phase reference signal being switched between $\sin \omega_1 t$ and $\sin \omega_2 t$ and between $\cos \omega_1 t$ and $\cos \omega_2 t$ for the two demodulators. Likewise, the modulator signal generator would have two modes of operation: sine wave and square wave. The two dither waveforms can, in this case, be either at the same frequency or at two separate frequencies.

If the effect of rapid transitions on system performance can be ignored, square wave dither, or two-point indexing, can be used by itself as a single frequency of dither. Such dithering can, for example, be used in the embodiments of FIGS. 4 and 7, where the demodulator phase references are adjusted by the signal conditioning electronics circuits 17 and are in phase with the square wave modulation signal. This type of dither may be particularly suitable for gyrocompassing applications.

To provide a full three degree-of-freedom (3DOF) system of gyros with bias cancellation, at least two of the dither modulation axes must be nominally perpendicular.

As in the embodiment of FIG. 5, a single dither modulator can be used for two of the three gyros. The additional features of second harmonic demodulation or two frequency dither, although not shown in this figure, can be added for a pair of gyros sharing a common dither modulator.

For the third gyro of a 3DOF gyro Inertial Measurement Unit (IMU), it is necessary to apply a dither modulation to the Z-axis gyro measuring a vertical angular rate. Assuming the dither rate is applied about the X-axis (roll), then, up to the second-order terms, the Z-axis gyro output normal to a stationary leveled plane on the earth is given by the following equation:

$$\omega_z = \Omega_D \cos(\phi + A\sin\omega t) + B_z + v_z, \quad (2.1)$$

$$= \Omega_D \left\{ \cos\phi\left[1 - \frac{1}{4}A^2(1-\cos 2\omega t)\right] - A\sin\phi\sin\omega t \right\} + B_z + v_z,$$

where $\phi$ is an initial roll angle about the x-axis; $\Omega_D$ is the vertical (down) component of earth rotation rate at a given latitude; A is the modulation amplitude; $\omega$ is the dither angular frequency; and $B_z$ and $v_z$ are the bias and Gaussian random errors of the Z-gyro, respectively. Extracting the first and second harmonic components from equations (2.1), yields the first and second harmonic terms of $\omega_x$ and $\omega_y$ as follows:

$$H_\omega(\omega_z) = -\Omega_D A \sin\phi \sin\omega t, \quad (2.2)$$

$$H_{2\omega}(\omega_z) = \frac{1}{4}\Omega_D A^2 \cos\phi \cos 2\omega t \quad (2.3)$$

This second dither motion, i.e. mechanical modulation for the z-axis gyro, is applied about x-axis. The second dither rate vector is given by:

$$D_2^d = (A\omega\cos\omega t \; 0 \; 0)^T.$$

Then, due to possible misalignment angles $\delta\theta_z$ and $\delta\theta_y$ about the x-axis with respect to the z- and y-axes, respectively, the dither rates can be transformed to the x-, y- and z-axes through the misalignment matrix $\delta Q_d^b$:

$$D_2^b = \delta Q_d^b D_2^d$$

$$= \begin{pmatrix} \cos\delta\theta_y\cos\delta\theta_z & -\sin\delta\theta_z & \cos\delta\theta_z\sin\delta\theta_y \\ \cos\delta\theta_y\sin\delta\theta_z & \cos\delta\theta_z & \sin\delta\theta_y\sin\delta\theta_z \\ -\sin\delta\theta_y & 0 & \cos\delta\theta_y \end{pmatrix} \begin{pmatrix} A\omega\cos\omega t \\ 0 \\ 0 \end{pmatrix},$$

$$= \begin{pmatrix} \cos\delta\theta_y\cos\delta\theta_z A\omega\cos\omega t \\ \cos\delta\theta_y\sin\delta\theta_z A\omega\cos\omega t \\ -\sin\delta\theta_y A\omega\cos\omega t \end{pmatrix}.$$

Then, the second component of $D_2^b$ measured by the Z-axis gyro is given by:

$$(D_2^b)_z = -\sin\delta\theta_y A\omega\cos\omega t$$

Then, applying the first harmonic technique for bias cancellation gives:

$$\langle [H_\omega(\omega_z) + (D_2^b)_z]\cos\omega t\rangle_\omega = -\frac{1}{2}\sin\delta\theta_y A\omega, \quad (2.4)$$

$$\langle [H_\omega(\omega_z) + (D_2^b)_z]\sin\omega t\rangle_\omega = -\frac{1}{2}\Omega_D A\sin\phi.$$

In Equation (2.4), however, the first harmonic term corresponding to the desired rate signal is not observable, i.e., it is zero if $\phi=0$. In other words, if the z-axis gyro input axis is vertical, the first harmonic demodulation result always gives a null value. This singularity problem can be resolved by letting $\phi \to \phi + \pi/2$, i.e., Z $\to$ Y2 (as gyro input-axis), as illustrated in FIG. 11. When this is done, $$\omega_{y2} = -\Omega_D \sin(\phi + A\sin\omega t) + B_{y2} + v_{y2}, \quad (2.5)$$

and $$H_\omega(\omega_{y2}) = -\Omega_D A\cos\phi\sin\omega t. \quad (2.6)$$

The second component of $D_2^b$ measured by Y2-gyro is given by:

$$(D_2^b)_{y2} = \cos\delta\theta_y \sin\delta\theta_z A\omega\cos\omega t \quad (2.7)$$

Finally, $$\langle [H_\omega(\omega_{y2}) + (D_2^b)_{y2}]\cos\omega t\rangle_\omega = \frac{1}{2}\cos\delta\theta_y\sin\delta\theta_z A\omega, \quad (2.8)$$

$$\langle [H_\omega(\omega_{y2}) + (D_2^b)_{y2}]\sin\omega t\rangle_\omega = -\frac{1}{2}A\cos\phi.$$

Figure 16:
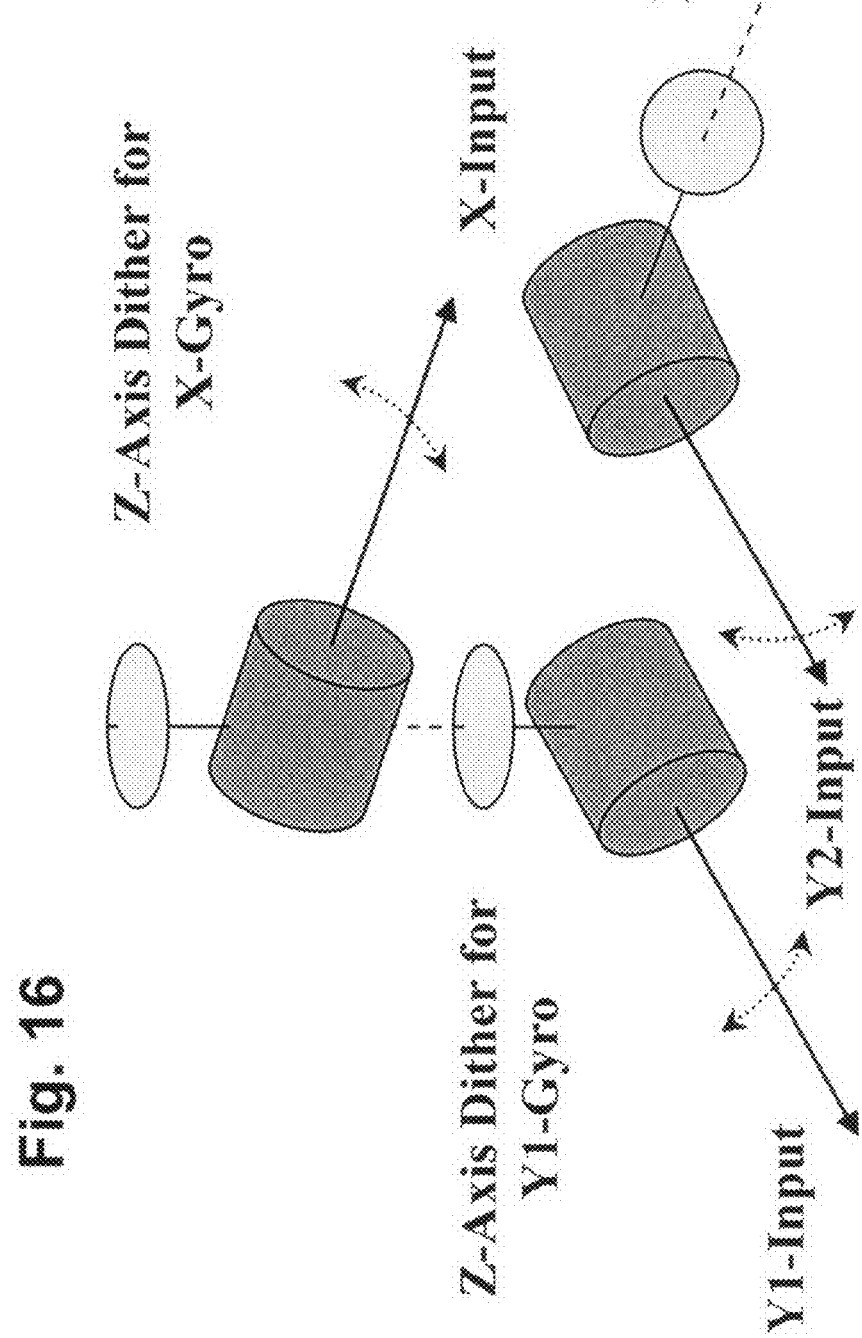
FIGS. 16-20 are schematic illustrations of additional embodiments of inertial rate systems with gyro bias washout modulation according to the invention.

Equations (2.8) can be called the fundamental equations of the first harmonic bias cancellation technique for the third gyro (for measuring vertical angular rate). This 3-axis IMU configuration is illustrated in FIG. 16.

In this embodiment, the X and Y1 gyros are dithered about the z-axis, either by a common dither modulator or separate ones. The Y2-gyro is initially aligned with input axis parallel to the Y1 gyro, but this gyro is responsible for measuring the vertical component of angular rate. This is made possible by dithering of the Y2 gyro about the X-axis. This inertial platform for a first harmonic implementation of bias cancellation for a three-axis IMU is particularly unique in that the three gyros have their input axes nominally in the same plane. The x-axis dither of the Y2 gyro permits measurement of the vertical rate component.

The foregoing analysis considered only the first harmonic technique for bias cancellation. For the second harmonic technique as applied to the vertical gyro, it follows from Equation (2.3) that $$\langle H_{2\omega}(\omega_z)\cos 2\omega t\rangle_{2\omega} = \frac{1}{8}\Omega_D A^2 \cos\phi. \qquad (2.9)$$

Equation (2.9) can be called the fundamental equations of the second harmonic bias cancellation technique for the third gyro (for measuring vertical angular rate). Unlike the first harmonic technique, using the second harmonic, the third gyro is aligned vertically and dithered about the x-axis, as can be seen in the embodiment of FIG. 17.

Summarizing the equations derived above as Equations (1.5), (1.6), (2.8), and (2.9) provides a set of fundamental equations for the first harmonic technique for bias cancellation or washout for a three-axis gyro IMU (as in the embodiment of FIG. 16):

$$\begin{cases} \langle [H_\omega(\omega_x) + D_x]\cos\omega t\rangle_\omega = \frac{1}{2}\cos\delta\theta_x \sin\delta\theta_y A\omega, \\ \langle [H_\omega(\omega_x) + D_x]\sin\omega t\rangle_\omega = -\frac{1}{2}\Omega_N A\sin\Psi, \\ \langle [H_\omega(\omega_y) + D_y]\cos\omega t\rangle_\omega = -\frac{1}{2}\sin\delta\theta_x A\omega, \\ \langle [H_\omega(\omega_y) + D_y]\sin\omega t\rangle_\omega = -\frac{1}{2}\Omega_N A\cos\Psi, \\ \langle [H_\omega(\omega_{y2}) + (D_2^b)_{y2}]\cos\omega t\rangle_\omega = \frac{1}{2}\cos\delta\theta_y \sin\delta\theta_z A\omega, \\ \langle [H_\omega(\omega_{y2}) + (D_2^b)_{y2}]\sin\omega t\rangle_\omega = -\frac{1}{2}\Omega_D A\cos\phi. \end{cases} \qquad (3.1)$$

Figure 17:
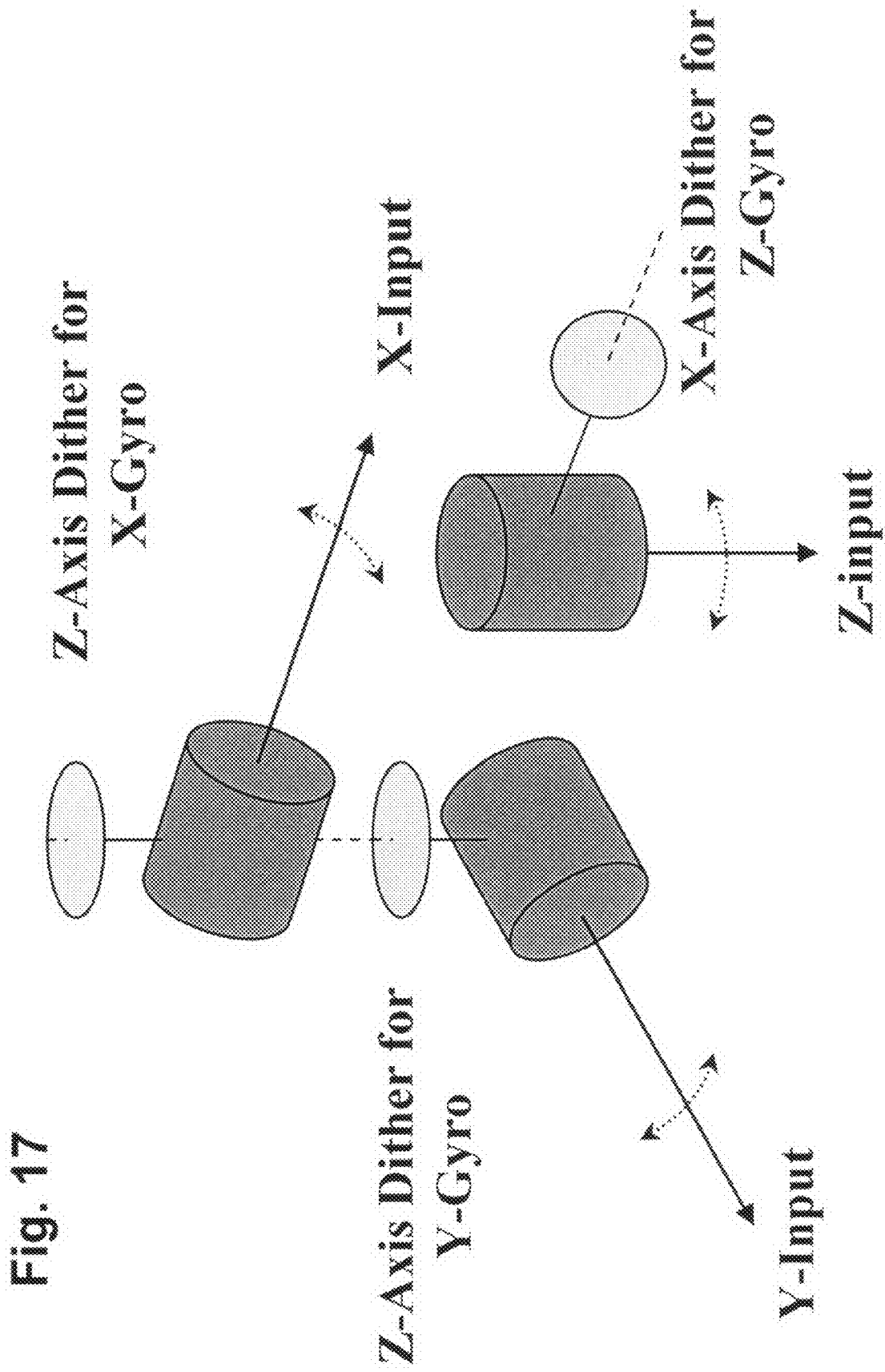

And for the second harmonic technique for a three-axis gyro IMU as in the embodiment of FIG. 17:

$$\begin{cases} \langle H_{2\omega}(\omega_x)\varphi_{2\omega}(t)\rangle_{2\omega} = \frac{1}{8}\Omega_N A^2 \cos\Psi, \\ \langle H_{2\omega}(\omega_y)\varphi_{2\omega}(t)\rangle_{2\omega} = \frac{1}{8}\Omega_N A^2 \sin\Psi, \\ \langle H_{2\omega}(\omega_z)\varphi_{2\omega}(t)\rangle_{2\omega} = \frac{1}{8}\Omega_D A^2 \cos\phi. \end{cases} \qquad (3.2)$$

where $$\varphi_{2\omega}(t) \equiv \begin{cases} \cos 2\omega t & \text{if modulation function is }\cos 2\omega t \\ \sin 2\omega t & \text{if modulation function is }\sin 2\omega t. \end{cases} \qquad (3.3)$$

Gyrocompassing

From the second and fourth equations in (3.1), it follows that $$\Psi = \tan^{-1}\frac{\langle [H_\omega(\omega_x) + D_x]\sin\omega t\rangle_\omega}{\langle [H_\omega(\omega_y) + D_y]\sin\omega t\rangle_\omega}. \qquad (4.1)$$

Thus, a heading can be calculated using the first harmonic technique for signal processing of X- and Y-gyro readouts to obtain a coarse alignment.

Similarly, it follows from Equations (3.2) that $$\Psi = \tan^{-1}\frac{\langle H_{2\omega}(\omega_y)\varphi_{2\omega}(t)\rangle_{2\omega}}{\langle H_{2\omega}(\omega_x)\varphi_{2\omega}(t)\rangle_{2\omega}}. \qquad (4.2)$$

So, a heading can also be calculated using the second harmonic technique for signal processing of X- and Y-gyro readouts to obtain a coarse alignment.

From Equations (3.1), and setting $K \equiv 2A^{-1}$ (Equation 5.1) as a scale factor, it is possible to reconstruct strapdown gyro readouts of X (forward), Y (right-wing), and Z (down) gyro axes as illustrated in FIG. 1 such that $$\begin{cases} \hat{\omega}_x = -K\langle [H_\omega(\omega_y) + D_y]\sin\omega t\rangle_\omega \\ \hat{\omega}_y = K\langle [H_\omega(\omega_x) + D_x]\sin\omega t\rangle_\omega \\ \hat{\omega}_z = K\langle [H_\omega(\omega_{y2}) + (D_2^b)_{y2}]\sin\omega t\rangle_\omega. \end{cases} \qquad (5.2)$$

Equations (5.2) express a set of 3-axis strapdown gyro outputs using the outputs obtained from the first harmonic bias cancellation technique. Similarly, from equations (3.2), and defining $K \equiv 8A^{-2}$ (Equation 5.3) as a scale factor, it is also possible to reconstruct the strapdown gyro readouts of X (forward), Y (right-wing), and Z (down) gyro axes using the second harmonic bias cancellation technique such that:

$$\begin{cases} \hat{\omega}_x = K\langle [H_{2\omega}(\omega_x)\varphi_{2\omega}(t)]\rangle_{2\omega} \\ \hat{\omega}_y = -K\langle [H_{2\omega}(\omega_y)\varphi_{2\omega}(t)]\rangle_{2\omega} \\ \hat{\omega}_z = -K\langle [H_{2\omega}(\omega_z)\varphi_{2\omega}(t)]\rangle_{2\omega}. \end{cases} \qquad (5.4)$$

Now, performing angular measurements per Equations (5.2) or (5.4), angular rate measurement can be defined in a new frame [X' (forward), Y' (left-wing), and Z' (up-canopy)] (a common body frame) such that $$\omega^b \equiv (\omega_1{}^b \omega_2{}^b \omega_3{}^b)^T = (\hat{\omega}_x, -\hat{\omega}_y, -\hat{\omega}_z)^T \qquad (5.5)$$

Then, assuming specific force measurements in the same X'-Y'-Z' body frame by a set of 3-axis strapdown accelerometers, we have $$f^b \equiv (f_1{}^b f_2{}^b f_3{}^b)^T \qquad (5.6)$$

Figure 18:
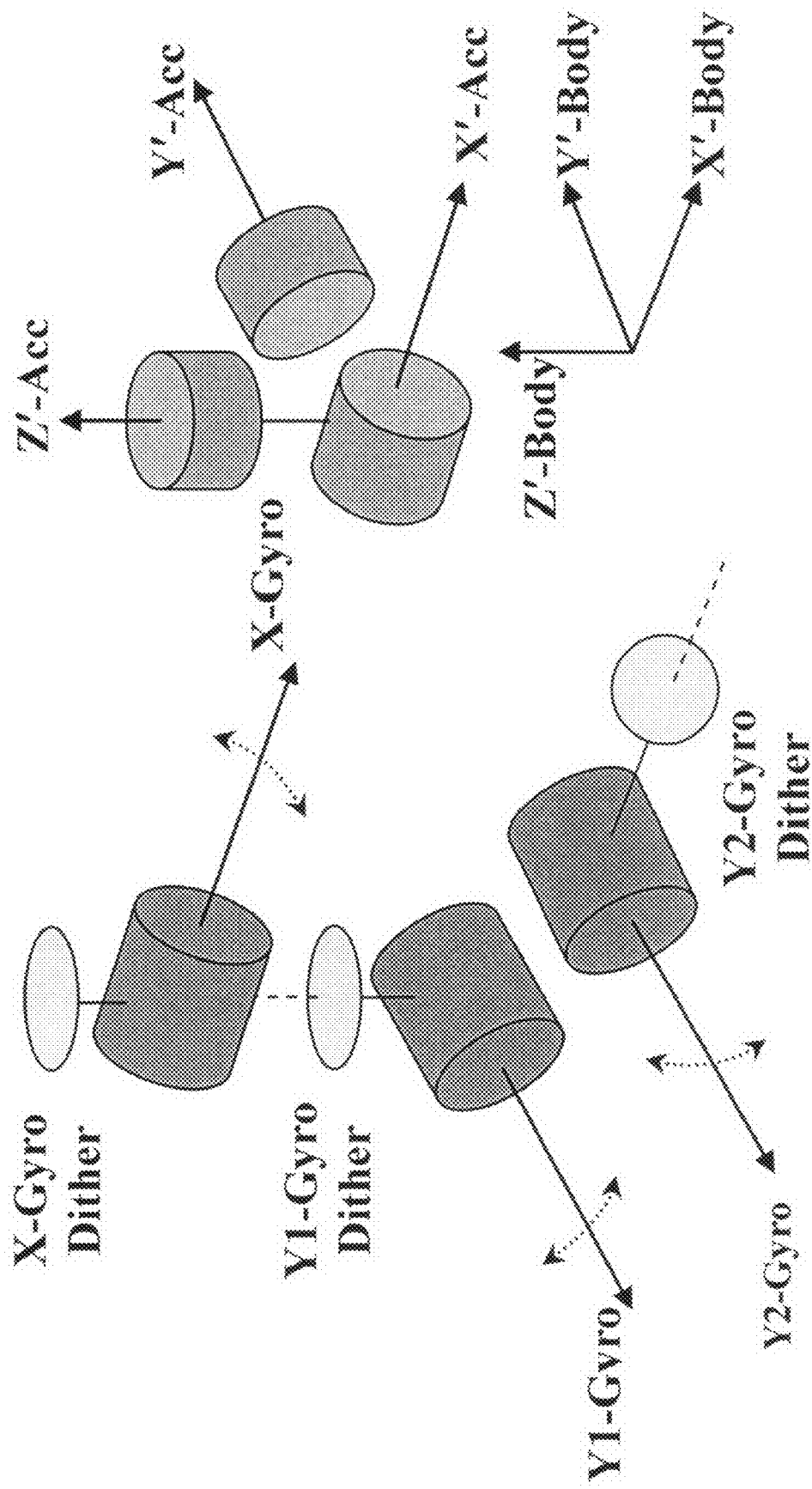
Figure 19:
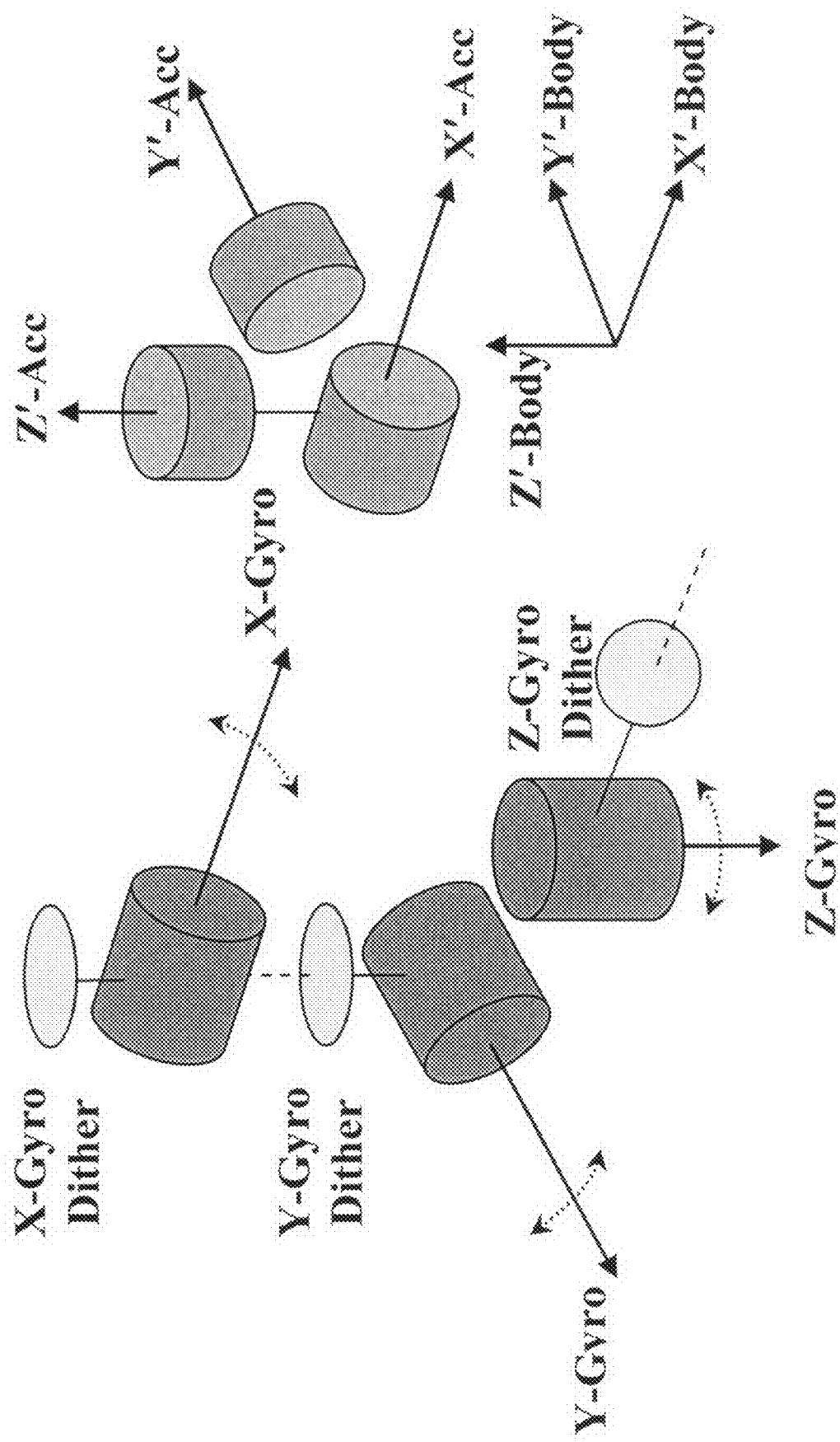

FIGS. 18 and 19 illustrate six-degree-of-freedom (6DOF) strapdown IMU's utilizing the $1^{st}$ and $2^{nd}$ harmonic techniques for gyro bias cancellation, respectively. A triad of three-axis accelerometers is contained in the IMU whose body frame coincides with the accelerometer frame. Now, $$f^b = C_n^b f^n = (C_b^n)^T f^n = (C_{ij})^T f^n = (C_{ji}) f^n$$

$$= \begin{pmatrix} f_1^b \\ f_2^b \\ f_3^b \end{pmatrix} = \begin{pmatrix} C_{11} & C_{21} & C_{31} \\ C_{12} & C_{22} & C_{32} \\ C_{13} & C_{23} & C_{33} \end{pmatrix} \begin{pmatrix} 0 \\ 0 \\ g \end{pmatrix}$$

$$= g \begin{pmatrix} C_{31} \\ C_{32} \\ C_{33} \end{pmatrix} = \begin{pmatrix} 0 \cdot C_{21} + g \cdot C_{31} \\ 0 \cdot C_{22} + g \cdot C_{32} \\ 0 \cdot C_{23} + g \cdot C_{33} \end{pmatrix}$$

$$\omega^b = C_n^b \omega^n = (C_b^n)^T \omega^n = (C_{ij})^T \omega^n = (C_{ji}) \omega^n$$

$$= \begin{pmatrix} \omega_1^b \\ \omega_2^b \\ \omega_3^b \end{pmatrix} = \begin{pmatrix} C_{11} & C_{21} & C_{31} \\ C_{12} & C_{22} & C_{32} \\ C_{13} & C_{23} & C_{33} \end{pmatrix} \begin{pmatrix} 0 \\ \Omega_{ie} \cos L \\ \Omega_{ie} \sin L \end{pmatrix}$$

$$= \begin{pmatrix} \Omega_{ie} \cos L \cdot C_{21} + \Omega_{ie} \sin L \cdot C_{31} \\ \Omega_{ie} \cos L \cdot C_{22} + \Omega_{ie} \sin L \cdot C_{32} \\ \Omega_{ie} \cos L \cdot C_{23} + \Omega_{ie} \sin L \cdot C_{33} \end{pmatrix}$$

where $C_n^b$ is the direction cosine matrix from the local-level navigation frame (East-North-Up) to the body frame, with $\Omega_{ie}$ being the Earth rotation rate and L being the latitude of the alignment location. Now expressing the above equations using decoupled forms for each body axis, $$\begin{pmatrix} \omega_j^b \\ f_j^b \end{pmatrix} = \begin{pmatrix} \Omega_{ie} \cos L & \Omega_{ie} \sin L \\ 0 & g \end{pmatrix} \begin{pmatrix} C_{2j} \\ C_{3j} \end{pmatrix}, (j = 1, 2, 3). \quad (5.7)$$

Normalizing the left hand side of the previous equation gives $$\begin{pmatrix} \omega_j^b / \Omega_{ie} \\ f_j^b / g \end{pmatrix} = \begin{pmatrix} \cos L & \sin L \\ 0 & 1 \end{pmatrix} \begin{pmatrix} C_{2j} \\ C_{3j} \end{pmatrix}, (j = 1, 2, 3). \quad (5.8)$$

Namely, we may define the measurement model:

$$Z_k^j = H x_k^j + v_k^j \quad (5.9)$$

where $$z_k^j \equiv \begin{pmatrix} \omega_j^b / \Omega_{ie} \\ f_j^b / g \end{pmatrix} \quad (5.10)$$

$$H \equiv \begin{pmatrix} \cos L & \sin L \\ 0 & 1 \end{pmatrix} \quad (5.11)$$

$$x_k^j \equiv \begin{pmatrix} C_{2j} \\ C_{3j} \end{pmatrix} \quad (5.12)$$

$$v_k^j \equiv \begin{pmatrix} v\omega_k^j \\ vf_k^j \end{pmatrix} \quad (5.13)$$

at the k-th time step and for the j-th body axis (j=1, 2, 3). Finally, we also have a state space model:

$$X_{k+1}^j = \Phi_{k+1,k} x_k^j \quad (5.14)$$

where $$\Phi_{k+1,k} \equiv \begin{pmatrix} 1 & 0 \\ 0 & 1 \end{pmatrix} \quad (5.15)$$

$$Q \equiv 0 \quad (5.16)$$

Assuming the strapdown platform is stationary during the alignment, the steady state model can be assumed as in the equations (5.14)-(5.16) above. Through a Kalman filtering process, the state vector $$x_k^j = \begin{pmatrix} C_{2j}(k) \\ C_{3j}(k) \end{pmatrix}, (j = 1, 2, 3) \quad (5.17)$$

is estimated and updated at time step k. Then, since the direction cosine matrix (DCM) is orthogonal, namely, $$C_b^n (C_b^n)^T = C_b^n (C_b^n)^{-1} = I, \text{(I=Identity Matrix)}$$

The coefficients of the first row of the DCM are then calculated by $$C_{11} = C_{22} C_{33} - C_{32} C_{23},$$

$$C_{12} = C_{31} C_{23} - C_{21} C_{33}, \quad (5.18)$$

$$C_{13} = C_{21} C_{32} - C_{31} C_{22}$$

To see this is so, let $$A^1 \equiv \begin{pmatrix} C_{11} \\ C_{12} \\ C_{13} \end{pmatrix}; A^2 \equiv \begin{pmatrix} C_{21} \\ C_{22} \\ C_{23} \end{pmatrix}; \text{ and } A^3 \equiv \begin{pmatrix} C_{31} \\ C_{32} \\ C_{33} \end{pmatrix}$$

Then we have $$A^1 = A^2 \times A^3,$$

where $A^2$ and $A^3$ are known via Equation (5.17). Henceforth, Equations (5.18) completely determine the body-to-local-level DCM. Now the Euler angles are derived from the body-to-local-level DCM, Roll: $\phi = a \tan(C_{32}/C_{33})$;

Pitch: $\theta = a \tan(C_{31}/\sqrt{C_{32}^2 + C_{33}^2})$; (5.19)

Heading: $\Psi = a \tan(C_{11}/C_{21})$.

In addition, the desired orthogonality of the body-to-local-level DCM–$C_b^n$ is always maintained by Equations (5.18).

Misalignment Calibration

Misalignment estimation (for purposes of calibration) using the first harmonic technique for bias cancellation is given by Equations (1.5) and (2.8), or by Equations (3.1) such that $$\langle [H_\omega(\omega_x) + D_x]\cos\omega t\rangle_\omega = \frac{1}{2}\cos\delta\theta_x\sin\delta\theta_y A\omega, \quad (6.1)$$

$$\langle [H_\omega(\omega_y) + D_y]\cos\omega t\rangle_\omega = -\frac{1}{2}\sin\delta\theta_x A\omega,$$

$$\langle [H_\omega(\omega_{y2}) + (D_2^b)_{y2}]\cos\omega t\rangle_\omega = \frac{1}{2}\cos\delta\theta_y\sin\delta\theta_z A\omega.$$

Defining a scale factor S $$S = 2A^{-1}\omega^{-1}, \quad (6.2)$$

from equations (6.1) and (6.2) it follows that $$\begin{cases} \cos\delta\theta_x\sin\delta\theta_y = S\cdot\langle[H_\omega(\omega_x) + D_x]\cos\omega t\rangle_\omega, \\ \sin\delta\theta_x = -S\cdot\langle[H_\omega(\omega_y) + D_y]\cos\omega t\rangle_\omega, \\ \cos\delta\theta_y\sin\delta\theta_z = S\cdot\langle[H_\omega(\omega_{y2}) + (D_2^b)_{y2}]\cos\omega t\rangle_\omega \end{cases} \quad (6.3)$$

Assume that the misalignment angles are small enough, i.e. $\cos\delta\theta_x = \cos\delta\theta_y = \cos\delta\theta_z \approx 1$ and $\sin\delta\theta_x \approx \delta\theta_x$; $\sin\delta\theta_y \approx \delta\theta_y$; $\sin\delta\theta_z \approx \delta\theta_z$.
Then, Equations (6.3) become:

$$\begin{cases} \delta\theta_x \approx -S\cdot\langle[H_\omega(\omega_y) + D_y]\cos\omega t\rangle_\omega, \\ \delta\theta_y \approx S\cdot\langle[H_\omega(\omega_x) + D_x]\cos\omega t\rangle_\omega, \\ \delta\theta_z \approx S\cdot\langle[H_\omega(\omega_{y2}) + (D_2^b)_{y2}]\cos\omega t\rangle_\omega. \end{cases} \quad (6.4)$$

Thus, a three degree-of-freedom inertial measurement unit (IMU) with bias cancellation, including means for determining dither misalignment angles, has been provided. The additional features described with reference to 1 and 2 degree-of-freedom embodiments can readily be included in the IMU's described, i.e., selective amplification of the modulation signal using the increased sensitivity at specific frequencies of one or more of the gyros; and estimation of, and compensation for, the phase errors at demodulation, including the use of two frequencies of dither and/or a combination of square wave and sine wave dither waveforms.

In yet another embodiment of the invention, either in the form of a single sensor or as a system of sensors, the estimated misalignment angles, as in equations (6.4), are mechanically compensated for by use of a tiltable platform, preferably one that is controllable by an electronic signal. Such a platform, preferably mounted between the dither modulator and a given gyro, can be constructed using piezoelectric or other suitable materials, as is well known. The effect of misalignment errors can be eliminated in real time using a feedback signal derived from the estimated misalignment angles and driving these angles to a null using the tiltable platform.

Two-Point Indexing (TPI), or square-wave modulation, can be considered in a six-degree-of-freedom (6-DOF) mechanization of a strapdown IMU comprising three gyros and three accelerometers. In the embodiment illustrated in FIG. 20, both three-axis sets of gyros and accelerometers are mechanically aligned to a vehicle's right orthogonal body coordinate system, i.e. X-Forward (Toward Bow), Y-Right-Wing (To Starboard), and Z-Down (Toward Keel) coordinate frame.

The 3-axis accelerometer readout ($f_x^b$ $f_y^b$ $f_z^b$) may give pitch ($\theta$) and roll ($\phi$) Euler angles of the vehicle's attitude with respect to the local vertical coordinate frame, i.e. north, east, down (NED) such that $$\begin{cases} \theta = \arctan(-f_x^b/f_z^b), \\ \phi = \arctan\left(f_y^b / \sqrt{(f_x^b)^2 + (f_z^b)^2}\right). \end{cases} \quad (7.1)$$

From equation (7.1), the leveling direction cosine matrix (DCM) from the body to the locally leveled platform (not identical with NED-frame) can be calculated such that $$C_b^l = \begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix}. \quad (7.2)$$

Let $\omega_{ib}^b \equiv (\omega_1^b\ \omega_2^b\ \omega_3^b)^T$ be angular rate vector consisting of the output of the strapdown 3-axis gyro unit. Now, we obtain the leveled gyro readout by matrix (7.2) such that $$\begin{pmatrix} \omega_x \\ \omega_y \\ \omega_z \end{pmatrix} = C_b^l \omega_{ib}^b = \begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix} \begin{bmatrix} \omega_1^b \\ \omega_2^b \\ \omega_3^b \end{bmatrix}. \quad (7.3)$$

Thus, $$\begin{pmatrix} \omega_x \\ \omega_y \\ \omega_z \end{pmatrix} = \begin{bmatrix} \omega_1^b\cos\theta + \omega_2^b\sin\theta\sin\phi + \omega_3^b\sin\theta\cos\phi \\ \omega_2^b\cos\phi - \omega_3^b\sin\phi \\ -\omega_1^b\sin\theta + \omega_2^b\cos\theta\sin\phi + \omega_3^b\cos\theta\cos\phi \end{bmatrix}.$$

Assume that each gyro has a large bias but low noise ($\leq 10^{-3}$ deg/$\sqrt{\text{hr}}$). Now, the stationary and leveled X- and Y-gyro components in (7.3) are also modeled by $$\begin{cases} \omega_x = \Omega\cos L\cos\theta\cos\Psi + \Omega\sin L\sin\theta + B_x + v_x, \\ \omega_y = \Omega\cos L(\sin\phi\sin\theta\cos\Psi - \cos\phi\sin\Psi) - \Omega\sin L\sin\phi\cos\theta + B_y + v_y, \\ \omega_z = \Omega\cos L(\sin\phi\sin\Psi + \cos\phi\sin\theta\cos\Psi) - \Omega\sin L\cos\phi\cos\theta + B_z + v_z, \end{cases} \quad (7.4)$$

where
$\Psi$=vehicle's heading,
$\Omega$=earth rate,
L=vehicle's latitude
$B_i$=i-gyro fixed bias,
$v_i$=i-gyro zero-mean noise,
Tilts can be expressed using small angle approximations as:

$$\begin{cases} \phi \equiv -\delta\theta_x, \\ \theta \equiv -\delta\theta_y, \end{cases}$$

so that $$\begin{cases} \sin\phi \cong -\delta\theta_x, \\ \cos\phi \cong 1, \\ \sin\theta \cong -\delta\theta_y, \\ \cos\theta \cong 1. \end{cases} \quad (7.5)$$

Substituting equations (7.5) into equations (7.4), and considering the X-and Y- readouts, we have $$\begin{cases} \omega_x = \Omega \cos L \cos \Psi - \delta\theta_y \Omega \sin L + B_x + v_x \\ \omega_y = -\Omega \cos L \sin \Psi + \delta\theta_x \Omega \sin L + B_y + v_y \end{cases} \quad (7.6)$$

Taking a time average of (7.6) such that $$\begin{cases} \bar{\omega}_x = \frac{1}{T} \int_0^T \omega_x \, dt \\ \bar{\omega}_y = \frac{1}{T} \int_0^T \omega_y \, dt \end{cases}$$

Assuming that the zero-mean gyro noise becomes negligible through the average-time T, we have $$\begin{cases} \bar{\omega}_x = \Omega \cos L \cos \Psi - \delta\theta_y \Omega \sin L + B_x \\ \bar{\omega}_y = -\Omega \cos L \sin \Psi - \delta\theta_x \Omega \sin L + B_y \end{cases} \quad (7.7)$$

Figure 20:
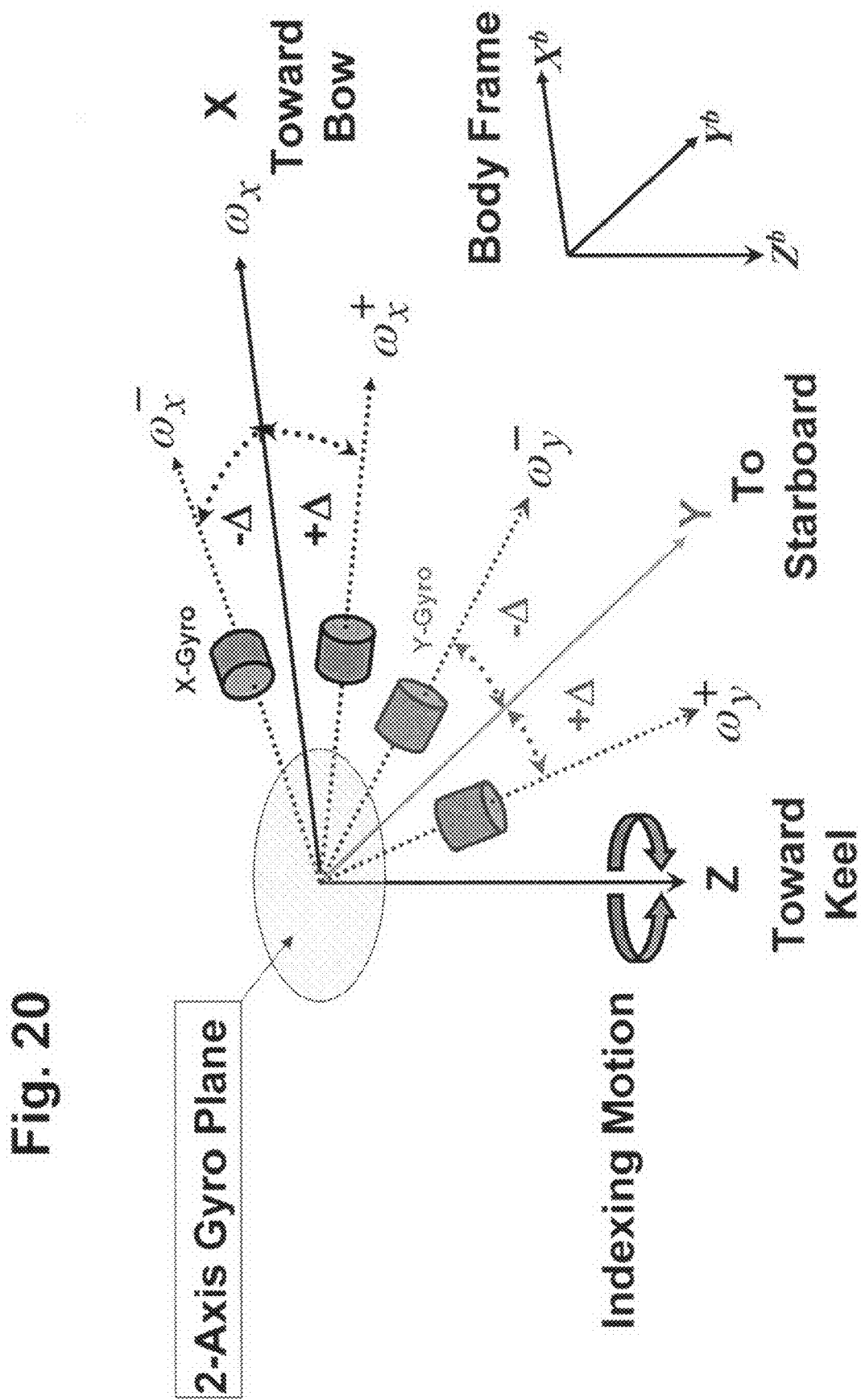

Now, as illustrated in FIG. 20, applying an indexing motion about vertical Z-axis and rotating the two-axis, leveled gyro unit counter-clockwise on the level-plane about the local vertical down axis by the rotation angle, $\Delta$, we have $$\begin{cases} \bar{\omega}_x^- = \Omega \cos L \cos(\Psi - \Delta) - \delta\theta_y \Omega \sin L + B_x \\ \bar{\omega}_y^- = -\Omega \cos L \sin(\Psi - \Delta) + \delta\theta_x \Omega \sin L + B_y \end{cases} \quad (7.8)$$

Next, rotate the gyro unit clockwise on the level-plane about the local vertical down axis by the rotation angle $2\Delta$, we have $$\begin{cases} \bar{\omega}_x^+ = \Omega \cos L \cos(\Psi + \Delta) - \delta\theta_y \Omega \sin L + B_x \\ \bar{\omega}_y^+ = -\Omega \cos L \sin(\Psi + \Delta) + \delta\theta_x \Omega \sin L + B_y \end{cases} \quad (7.9)$$

Subtracting equations (7.9) from equations (7.8), we have $$\begin{cases} \bar{\omega}_x^- - \bar{\omega}_x^+ = \Omega \cos L [\cos(\Psi - \Delta) - \cos(\Psi + \Delta)] \\ \bar{\omega}_y^- - \bar{\omega}_y^+ = -\Omega \cos L [\sin(\Psi - \Delta) - \sin(\Psi + \Delta)] \end{cases} \quad (7.10)$$

Thus, in (7.10), the misalignment terms of vertical earth rate disappear as well as fixed biases, so that $$\begin{cases} \bar{\omega}_x^- - \bar{\omega}_x^+ = 2\Omega \cos L \sin \Psi \sin \Delta, \\ \bar{\omega}_y^- - \bar{\omega}_y^+ = 2\Omega \cos L \sin \Delta \cos \Psi. \end{cases} \quad (7.11)$$

Assume $\sin \Delta \neq 0$, i.e., $\Delta \neq n\pi$, where n is an integer, so that from equations (7.11) it follows that $$\frac{\bar{\omega}_x^- - \bar{\omega}_x^+}{\bar{\omega}_y^- - \bar{\omega}_y^+} = \frac{\sin \Psi}{\cos \Psi} = \tan \Psi \quad (7.12)$$

Solving equation (7.12) for $\Psi$, we obtain $$\Psi = \arctan \frac{\bar{\omega}_x^- - \bar{\omega}_x^+}{\bar{\omega}_y^- - \bar{\omega}_y^+}. \quad (7.13)$$

Finally, using this value of $\Psi$ in equations (7.7), the sum of the gyro bias and the misalignment projection of the vertical earth rate is given by $$\begin{cases} B_x - \delta\theta_y \Omega \sin L = \bar{\omega}_x - \Omega \cos L \cos\left(\arctan \frac{\bar{\omega}_x^- - \bar{\omega}_x^+}{\bar{\omega}_y^- - \bar{\omega}_y^+}\right), \\ B_y + \delta\theta_x \Omega \sin L = \bar{\omega}_y + \Omega \cos L \sin\left(\arctan \frac{\bar{\omega}_x^- - \bar{\omega}_x^+}{\bar{\omega}_y^- - \bar{\omega}_y^+}\right), \end{cases}$$

Or, $$\begin{cases} B_x = \bar{\omega}_x - \Omega \cos L \cos\left(\arctan \frac{\bar{\omega}_x^- - \bar{\omega}_x^+}{\bar{\omega}_y^- - \bar{\omega}_y^+}\right) + \delta\theta_y \Omega \sin L, \\ B_y = \bar{\omega}_y + \Omega \cos L \sin\left(\arctan \frac{\bar{\omega}_x^- - \bar{\omega}_x^+}{\bar{\omega}_y^- - \bar{\omega}_y^+}\right) - \delta\theta_x \Omega \sin L. \end{cases} \quad (7.14)$$

We first need the value of latitude (L) to estimate the gyro bias. In the TPI method, X- and Y-misalignments affect the bias estimation by giving rise to the following bias estimation errors:

$$\begin{cases} \delta B_x = \delta\theta_y \Omega \sin L, \\ \delta B_y = -\delta\theta_x \Omega \sin L. \end{cases} \quad (7.15)$$

It is well known that $$\begin{cases} \delta\theta_x = \beta_y / g, \\ \delta\theta_y = -\beta_x / g, \end{cases}$$

where $\beta_x$ and $\beta_y$ are X- and Y-accelerometer bias errors, respectively, and g is the earth's gravity. In Walnut Creek, Calif., (Latitude=37.9272 °N), and assuming $\delta\theta_x = \delta\theta_y = 1$ [mrad] (leveled by 1-mg-grade accelerometer unit), Equations (7.14) give bias estimation errors of:

$$\begin{cases} \delta B_x = 0.0092 \, [\text{deg/hr}], \\ \delta B_y = -0.0092 \, [\text{deg/hr}]. \end{cases} \quad (7.16)$$

Unlike conventional north finder where the heading is derived by $$\Psi = -\arctan \frac{\bar{\omega}_y}{\bar{\omega}_x},$$

the TPI alignment given by equation (7.13) is completely insensitive to any small mis-leveling of the gyro platform. This implies that the TPI method is superior to a conventional north finder or north seeking device. In TPI, only the autonomous gyro bias calibration given by equations (7.14) is affected by misalignment.

The invention has a number of important features and advantages. By eliminating the effects of bias offset, it makes it possible to use less expensive rate sensors or gyros which are relatively small in size but would otherwise be precluded from use because of their relatively large bias offsets. The smaller sensors lend themselves to use with smaller modulators, which provides a compact and relatively inexpensive system with improved accuracy. Fixed bias offsets are eliminated or cancelled without producing a spurious rotation rate signal, and the system can also provide cancellation of residual errors in offset compensation models.

The smaller sensors can mounted to equally smaller modulators, even modulators contained within the gyro package or made integrally with the sensing element itself. This permits a compact and relatively low cost system design with improved gyro accuracy. A full inertial measurement unit with gyro bias cancellation permits self-alignment or gyrocompassing and inertial navigation using sensors that heretofore have not been suitable for such applications.

It is apparent from the foregoing that a new and improved improved inertial sensor, inertial measurement system, and method have been provided. While only certain presently preferred embodiments have been described in detail, as will be apparent to those familiar with the art, certain changes and modifications can be made without departing from the scope of the invention as defined by the following claims.

The invention claimed is:

1. A system for cancelling zero rate offset bias in a gyroscope which senses rate of rotation about an input axis, comprising: a modulator for dithering the gyroscope back and forth about an axis substantially perpendicular to the input axis in a substantially square wave motion at a predetermined frequency, and a demodulator for demodulating signals from the gyroscope at the first harmonic of the predetermined frequency.

2. The system of claim 1 wherein the system is a gyrocompassing system.

3. The system of claim 1 wherein the modulator comprises a galvanometer.

4. A system for cancelling zero rate offset bias in a gyroscope which senses rate of rotation about its input axis, comprising: means for dithering the gyroscope about a dither axis substantially perpendicular to the input axis at a dither frequency, at least one demodulator for demodulating signals from the gyroscope at the first harmonic of the dither frequency in accordance with a phase reference signal to provide an output signal which is susceptible to errors resulting from misalignment of the gyroscope relative to the dither axis, and means for adjusting the phase relationship between the phase reference signal and the signals from the gyroscope to eliminate misalignment errors in the output signal.

5. The system of claim 4 wherein the means for adjusting the phase relationship comprises a phase compensation circuit for adjusting the phase of the signals from the gyroscope.

6. The system of claim 4 wherein the means for adjusting the phase relationship comprises means for adjusting the phase of the phase reference signal.

7. The system of claim 4 wherein the means for dithering the gyroscope comprises a galvanometer.

8. A system for cancelling zero rate offset bias in a gyroscope which senses rate of rotation about an input axis, comprising: a modulator for dithering the gyroscope about an axis perpendicular to the input axis in accordance with signals applied thereto, means for applying two separate dither waveforms to the modulator, and means for demodulating signals from the gyroscope in accordance with the two dither waveforms.

9. The system of claim 8 wherein at least one of the waveforms is a square wave.

10. The system of claim 8 wherein at least one of the waveforms is sinusoidal.

11. The system of claim 8 wherein the modulator comprises a galvanometer.

12. A system for cancelling zero rate offset bias in a gyroscope which senses rate of rotation about an input axis, comprising: means for dithering the gyroscope about a dither axis substantially perpendicular to the input axis at a dither frequency, first and second demodulators for demodulating signals from the gyroscope at the first harmonic of the dither frequency, and means for applying reference signals in phase quadrature to the demodulators.

13. The system of claim 12 wherein the means for dithering the gyroscope comprises a galvanometer.

14. An inertial measurement system for obtaining heading and rate of rotation, comprising: first and second gyroscopes having input axes disposed orthogonally of each other in a plane, a modulator for dithering the gyroscopes about an axis substantially perpendicular to the plane, and two demodulators with references in phase quadrature for demodulating signals from each of the two gyroscopes.

15. The system of claim 14 wherein the modulator comprises a galvanometer.

16. An inertial measurement system, comprising: a gyroscope having an input axis disposed in a plane, a modulator for dithering the input axis about a dither axis substantially perpendicular to the plane at a dither frequency, and first and second demodulators for demodulating signals from the gyroscope at the second harmonic of the dither frequency with phase references in phase quadrature for measuring a component of externally applied rate of rotation in the plane without sensitivity to misalignment between the dither axis and the plane.

17. The system of claim 16 wherein the modulator comprises a galvanometer.

18. The system of claim 16 wherein the gyroscope has a gain which varies with frequency, and the dither frequency is selected in accordance with the frequency at which the gain is the greatest in order to enhance signal-to-noise performance.

19. The system of claim 16 including means for comparing signals from the first and second demodulators to make gyroscope response insensitive to changes in frequency difference between excitation and pickup frequencies.

20. The system of claim 19 wherein the dither frequency is adjusted to be exactly one-half the difference between the excitation and pickup frequencies.

21. A system for cancelling zero rate offset bias of in a gyroscope which senses rate of rotation about an axis in a plane, comprising: means for dithering the gyroscope about a dither axis substantially perpendicular to the plane at a dither frequency, a first pair of demodulators for demodulating signals from the gyroscope at the first harmonic of the dither frequency, a second pair of demodulators for demodulating signals from the gyroscope at the second harmonic of the dither frequency, and means for applying reference signals in phase quadrature to each of the two pairs of demodulators.

22. The system of claim 21 including means responsive to the demodulated signals for calculating the rate of rotation in the plane and the orientation of the system with respect to the axis about which the rate of rotation is sensed.

23. An inertial system, comprising: first, second and third gyroscopes having input axes disposed approximately in a plane, means for dithering the first and second gyroscopes about an axis substantially perpendicular to their input axes, means for dithering the third gyroscope about an axis in the plane and perpendicular to the input axis of the third gyroscope, and means for demodulating signals from each of the gyroscopes at the frequency at which the gyroscope is dithered.

24. The system of claim 23 wherein the first and second gyroscopes are dithered at the same frequency.

25. The system of claim 23 including first and second accelerometers responsive to acceleration along first and second axes in the plane, and a third accelerometer responsive to acceleration along an axis perpendicular to the plane.

26. An inertial system, comprising: first and second gyroscopes having input axes disposed approximately in a plane, means for dithering the first and second gyroscopes about an axis substantially perpendicular to their input axes, a third gyroscope having an input axis oriented substantially perpendicular to the input axes of the first and second gyroscopes, means for dithering the third gyroscope about an axis in the plane, and means for demodulating signals from each of the gyroscopes at the second harmonic of the frequency at which the gyroscope is dithered.

27. The system of claim 26 wherein the first and second gyroscopes are dithered at the same frequency.

28. The system of claim 26 wherein the gyroscopes have gains which vary with frequency, and the frequency at which each gyroscope is dithered is selected in accordance with the frequency at which the gain of that tyroscope is the greatest in order to enhance signal-to-noise performance.

29. The system of claim 26 including first and second accelerometers responsive to acceleration along first and second axes in the plane, and a third accelerometer responsive to acceleration along an axis perpendicular to the plane.

* * * * *